United States Patent
Guo et al.

(10) Patent No.: US 12,482,205 B2
(45) Date of Patent: Nov. 25, 2025

(54) VIRTUAL MODEL PROCESSING METHOD AND APPARATUS, ELECTRONIC DEVICE AND STORAGE MEDIUM

(71) Applicant: Beijing Bytedance Network Technology Co., Ltd., Beijing (CN)

(72) Inventors: Yi Guo, Beijing (CN); Xiaofeng Li, Beijing (CN); Jiali Pan, Beijing (CN); Jinyuan Wu, Beijing (CN); Xu Chen, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 341 days.

(21) Appl. No.: 18/023,646

(22) PCT Filed: Aug. 10, 2021

(86) PCT No.: PCT/CN2021/111735
§ 371 (c)(1),
(2) Date: Feb. 27, 2023

(87) PCT Pub. No.: WO2022/042290
PCT Pub. Date: Mar. 3, 2022

(65) Prior Publication Data
US 2023/0306700 A1   Sep. 28, 2023

(30) Foreign Application Priority Data
Aug. 31, 2020 (CN) .......................... 202010899471.6

(51) Int. Cl.
G06T 19/20 (2011.01)
G06T 5/70 (2024.01)
G06V 10/60 (2022.01)

(52) U.S. Cl.
CPC ............... *G06T 19/20* (2013.01); *G06T 5/70* (2024.01); *G06V 10/60* (2022.01);
(Continued)

(58) Field of Classification Search
USPC ......................................................... 345/633
See application file for complete search history.

(56) References Cited

U.S. PATENT DOCUMENTS

| | | | |
|---|---|---|---|
| 2004/0013272 A1* | 1/2004 | Reams | G10L 21/06 381/1 |
| 2007/0071413 A1* | 3/2007 | Takahashi | G11B 27/005 386/230 |

(Continued)

FOREIGN PATENT DOCUMENTS

| | | |
|---|---|---|
| CN | 106502606 A | 3/2017 |
| CN | 109977868 A | 7/2019 |

(Continued)

OTHER PUBLICATIONS

Office Action in CN202010899471.6, mailed Jul. 7, 2023, 7 pages.
International Search Report issued in corresponding International Application No. PCT/CN2021/111735 dated Nov. 1, 2021.

*Primary Examiner* — James A Thompson
*Assistant Examiner* — Kim Thanh T Tran
(74) *Attorney, Agent, or Firm* — Astute IP Law Group

(57) ABSTRACT

A virtual model processing method and apparatus, an electronic device and a storage medium are provided. Said method comprises: acquiring audio information; according to attribute information of the audio information, adjusting parameters of a virtual model; and according to the adjusted parameters of the virtual model, displaying the virtual model in a target image. The parameters of the virtual model are adjusted according to the attribute information of the audio information. The attribute information of the audio infor- (Continued)

mation can change with time. Accordingly, the parameters of the virtual model can also change with time.

17 Claims, 9 Drawing Sheets

(52) U.S. Cl.
CPC ............... *G06T 2219/2004* (2013.01); *G06T 2219/2012* (2013.01); *G06T 2219/2021* (2013.01)

(56) References Cited

U.S. PATENT DOCUMENTS

| | | | |
|---|---|---|---|
| 2012/0117373 A1* | 5/2012 | Aliakseyeu | G10H 1/368 |
| | | | 713/100 |
| 2016/0189397 A1 | 6/2016 | Mullins et al. | |
| 2017/0242578 A1* | 8/2017 | Zhong | G06F 3/041 |
| 2019/0004639 A1* | 1/2019 | Faulkner | G06F 3/048 |

FOREIGN PATENT DOCUMENTS

| | | |
|---|---|---|
| CN | 111540032 A | 8/2020 |
| CN | 112034984 A | 12/2020 |

* cited by examiner

VIRTUAL MODEL PROCESSING METHOD AND APPARATUS, ELECTRONIC DEVICE AND STORAGE MEDIUM

This application is the national phase of International Patent Application No. PCT/CN2021/111735 titled "VIRTUAL MODEL PROCESSING METHOD AND APPARATUS, ELECTRONIC DEVICE AND STORAGE MEDIUM", filed on Aug. 10, 2021, which claims priority to Chinese Patent Application No. 202010899471.6, titled "VIRTUAL MODEL PROCESSING METHOD AND APPARATUS, ELECTRONIC DEVICE AND STORAGE MEDIUM", filed on Aug. 31, 2020 with the China National Intellectual Property Administration, both of which are incorporated herein by reference in their entireties.

FIELD

The present disclosure relates to the field of information technology, and in particular to a method and a device for processing a virtual model, an electronic apparatus, and a storage medium.

BACKGROUND

With the development of smart terminals, more and more applications (APPs) may be installed in the smart terminals and provide users with corresponding services.

For example, an application with a function of augmented-reality may add a virtual model to a preset image or a terminal-captured image in order to enhance interest of the image.

However, the virtual model, conventionally pre-set or pre-stored in a database, usually remains unchanged after being added to an image. Hence, representation of the virtual model is inflexible.

SUMMARY

In order to solve, or at least partially solve, the above technical problems, embodiments of the present disclosure provide a method and a device for processing a virtual model, an electronic apparatus, and a storage medium, in order to achieve a linkage between a visual presentation and an audio presentation, so as to improve flexibility of a presentation of the virtual model.

A method for processing a virtual model is provided in an embodiment of the present disclosure. The method includes:
acquiring audio information;
performing an adjustment on a parameter of the virtual model based on an attribute of the audio information, where the parameter of the virtual model after the adjustment changes with time; and
displaying the virtual model in a target image based on the parameter after the adjustment, where the virtual model displayed in the target image changes with time.

A device for processing a virtual model is further provided in an embodiment of the present disclosure. The device includes:
an acquisition module, configured to acquire audio information;
an adjustment module, configured to perform an adjustment on a parameter of the virtual model based on an attribute of the audio information, where the parameter of the virtual model after the adjustment changes with time, and
a display module, configured to display the virtual model in a target image based on the parameter after the adjustment, where the virtual model displayed in the target image changes with time.

An electronic apparatus is further provided in an embodiment of the present disclosure. The electronic apparatus includes:
one or more processors, and
a memory storing one or more programs.
The one or more programs, when executed by the one or more processors, causes the one or more processors to implement the method for processing a virtual model as described above.

A computer-readable storage medium is further provided in the present disclosure. The computer-readable storage medium stores a computer program. The computer program, when executed by a processor, implements the method for processing a virtual model as described above.

Advantageous of the technical solutions provided in the embodiments of the present disclosure, compared to the conventional technologies, are described below. With the method for processing a virtual model provided in the embodiments of the present disclosure, a parameter of the virtual model is adjusted based on an attribute of audio information. Since the attribute of audio information may change with time, the parameter of the virtual model may change with time after adjusting the parameter of the virtual model based on the attribute of the audio information. Further, in response to the parameter of the virtual model changing with time, the virtual model displayed in the target image changes accordingly. That is to say, the virtual model displayed in the target image may change with the change of the audio information, and change of the audio information may be visually reflected through the virtual model. Hence, a linkage between a visual presentation and an audio presentation is achieved, and flexibility in presenting the virtual model is improved.

BRIEF DESCRIPTION OF THE DRAWINGS

The above and other features, advantages and aspects of various embodiments of the present disclosure will become clearer when taken in conjunction with the accompanying drawings and with reference to the following detailed description. Throughout the drawings, the same or similar reference numbers refer to the same or similar elements. It should be understood that the drawings are schematic and that the units and elements are not necessarily drawn to scale.

DETAILED DESCRIPTION

Figure 1:
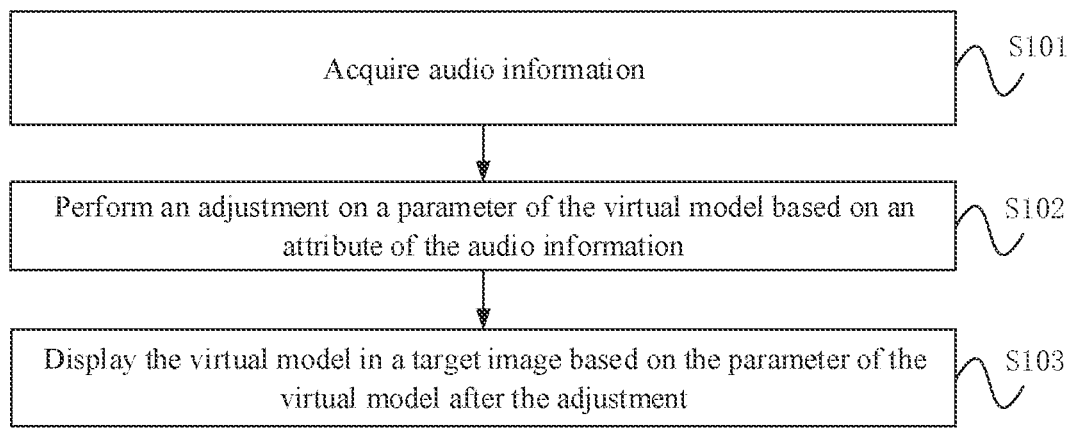
FIG. 1 is a flowchart of a method for processing a virtual model according to an embodiment of the present disclosure.

Embodiments of the present disclosure will be described in more detail below with reference to the accompanying drawings. While certain embodiments of the present disclosure are shown in the drawings, it should be understood that the present disclosure may be embodied in various forms and should not be construed as being limited to the embodiments set forth herein. The embodiments are provided for a more thorough and complete understanding. It should be understood that the drawings and embodiments of the present disclosure are only provided as examples, and are not intended to limit the protection scope of the present disclosure.

It should be understood that the various steps described in the method embodiments of the present disclosure may be performed in different orders and/or in parallel. Furthermore, method embodiments may include additional steps and/or omit an illustrated step. The scope of the present disclosure is not limited in this regard.

As used herein, the terms "including" and "comprising" and variations thereof are non-exclusive, i.e., meaning "including but not limited to". The term "based on" means "at least partially based on". The term "an embodiment" means "at least one embodiment", the term "another embodiment" means "at least one another embodiment", and the term "some embodiments" means "at least some embodiments". Relevant definitions of other terms will be given in the description below.

It should be noted that wordings such as "first" and "second" used in the present disclosure are only used to distinguish different devices, modules or units, and are not used to limit the order or interdependence of functions performed by these devices, modules or units.

It should be noted that the wordings of "a" and "a plurality" used in the present disclosure are illustrative rather than restrictive, and those skilled in the art should understand that unless clearly indicated otherwise, they should be understood as "one or more".

The names of messages or information exchanged between multiple devices in the embodiments of the present disclosure are only for illustrative purposes, and are not intended to limit the scope of these messages or information.

FIG. 1 is a flowchart of a method for processing a virtual model according to an embodiment of the present disclosure. The method is applicable in a client to process a virtual model, and may be executed by a device for processing a virtual model. The device may be implemented in software and and/or hardware, and may be configured in an electronic apparatus such as a terminal, specifically including a mobile phone, a computer, or a tablet computer. In an alternative embodiment, the method may be applicable in a server to process a virtual model, and may be executed by a device for processing a virtual model which may be implemented in software and/or hardware, and may be configured in an electronic apparatus, such as a server. As shown in FIG. 1, the method may specifically include steps S101 to S103.

In S101, audio information is acquired.

Figure 2:
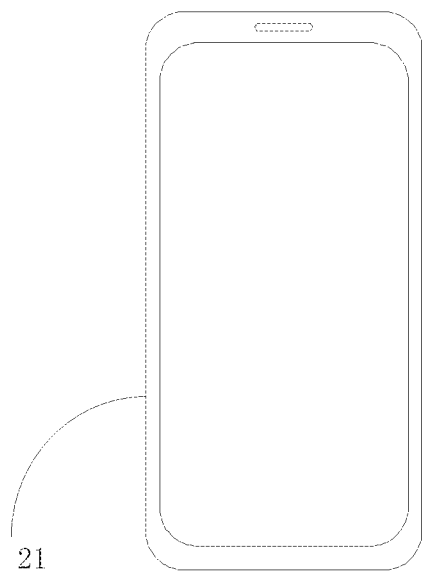
FIG. 2 is a schematic diagram of an application scenario according to an embodiment of the present disclosure.

Reference is made to FIG. 2. A terminal 21 may be configured to acquire the audio information. The audio information may include a sound from the terminal itself, a sound from a user, or a sound from a surrounding environment.

In an example, acquiring the audio information includes: acquiring audio information played by the terminal; and/or acquiring audio information in the surrounding environment.

For example, the terminal 21 may play the audio information and obtain the audio information played by the terminal 21. Alternatively, the terminal 21 may not play the audio information, but acquire the audio information in the surrounding environment. The terminal 21 may be provided with a sound sensor or audio sensor. The sound sensor or audio sensor may be, for example, a single microphone or a microphone array of multiple microphones.

The microphone or microphone array may collect the audio information played by the terminal 21 or the audio information in the surrounding environment of the terminal 21. The audio information in the surrounding environment of the terminal 21 may be played by other devices in the surrounding environment of the terminal 21, or may come from a user in the surrounding environment of the terminal 21.

In another application scenario, the terminal 21 may store the audio information in advance. Alternatively, the terminal 21 may acquire the audio information from another device, such as another terminal or server.

In addition, the terminal 21 may be provided with a display component. The display component may be a screen. The terminal 21 may display a target image on the screen. The target image may specifically include, for example, an image of a human face or another target object. Specific content and form of the target image are not limited herein.

In an implementation, the terminal 21 may be installed with a camera. In a case that the camera is turned on by the user, the camera may be configured to capture a target image, such as an image of a human face. Alternatively, the terminal 21 may be installed with an image application or video application. In a case that the camera is activated by the application, the camera captures a target image, such as an image of a human face. Further, the terminal 21 displays the target image on the screen.

In another implementation, the terminal 21 stores a preset image locally. In an example, the terminal 21 may acquire the preset image from another terminal or server. The preset image may be an image including a target object (such as a human face or another target object). Further, the terminal 21 processes the preset image through a preset image processing method, in order to extract an image of the target object from the preset image. The image of the target object may be determined as the target image. Further, the target image is displayed on the screen by the terminal 21.

It may be understood that, the above-mentioned methods for the terminal 21 to acquire the target image and display the target image on the screen are merely illustrative and not intended to be limiting. Other methods may also be possible in other embodiments.

In an example, the terminal 21 may further display a virtual model in the target image. In an embodiment, illustrative description is made taking an image of a human face as an example. It should be understood by those skilled in the art that, the target image in other embodiments is not limited to image of human face, and may be an image of another object. The target object is not limited to a human face, but may be any other object, which is not limited herein. The virtual model may specifically be a three-dimensional (3D) object in a virtual three-dimensional space rendered by a computer through a graphics technology. For example, in a case that a user uses a terminal to capture a video or image of a scene, the terminal may analyze image information of the video or image, obtain three-dimensional information of the scene, and add a virtual model to the video or image and perform rendering and synthesis through the computer graphics technology. A material of the virtual model may specifically include: color, texture, transparency, light and shadow effects, and the like. The material of the virtual model may be specifically defined or characterized by a series of graphics algorithms and rules. The material of the virtual model is specifically used to define the color, texture, transparency, light and shadow effect, and the like, of the virtual model for visual presentation.

In an implementation, the terminal 21 may acquire a sliding trajectory inputted by the user on the screen, generate a virtual model corresponding to the sliding trajectory, and display the virtual model at a first position in the target image (for example, an image of a human face or another target object).

In another implementation, the terminal 21 may perform detection on the image of the target object, for example, detect feature information of the image of the target object, generate a virtual model according to the feature information, and display the virtual model at a first position in the image of the target object. The first position may be determined by the user, or may be predefined by the terminal 21, or may be a random position in the image.

In an embodiment of the present disclosure, a quantity of virtual models displayed in the image of the target object may be one or more. In addition, the virtual model may be a three-dimensional model or a two-dimensional model.

In an example, the terminal 21 may acquire the audio information before displaying the virtual model in the image of the target object, or after displaying the virtual model in the image of the target object.

In S102, a parameter of the virtual model is adjusted based on an attribute of the audio information.

For example, after acquiring the audio information, the terminal 21 may analyze and extract an attribute of the audio information by using a digital signal processing technology, a deep learning technology, or other technologies. Further, the terminal 21 may adjust a parameter of the virtual model based on the attribute of the audio information. Since the attribute of the audio information usually changes with time, the parameter of the virtual model after the adjustment changes with time.

In an example, the attribute of the audio information includes at least one of: tone, volume, accent, or spectral intensity.

In an example, the parameter of the virtual model includes at least one of: a shape, a dimension, and a first color of the virtual model; or a position, a width, a moving speed, and a second color of a preset area on the virtual model.

An embodiment is described taking an example in which the target image is an image of a human face. In another embodiment, the target image is not limited to the image of a human face, and may be, for example, an image of another target object. That is to say, the target object in the target image is not limited to a human face, but may be another object.

Figure 3:
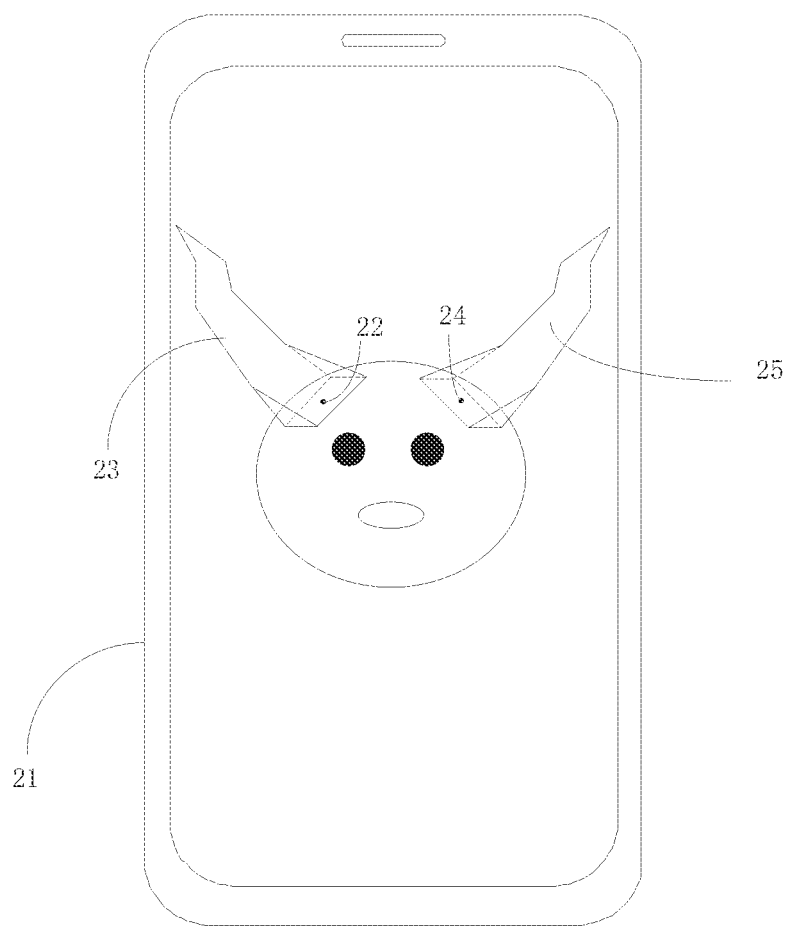
FIG. 3 is a schematic diagram of a virtual model according to an embodiment of the present disclosure.

Reference is made to FIG. 3. An image of a human face is displayed on the screen of the terminal 21. Further, the user may input a sliding trajectory on the screen. The terminal 21 may acquire target points related to the sliding trajectory. The target points may be multiple trajectory points or sampling points on the sliding trajectory. Alternatively, the target points may be multiple sampling points on a fitted curve obtained by the terminal 21 fitting multiple trajectory points on the sliding trajectory. Further, the terminal 21 may acquire a preset sub-model corresponding to each of the multiple target points. Different target points may correspond to a same or different preset sub-models. In addition, a specific shape of the preset sub-model corresponding to each of the target points is not limited here. For example, the preset sub-model may be a cylinder in an embodiment. The terminal 21 converts the preset sub-model corresponding to each of the target points into a target sub-model based on geometric information of the target point. The target sub-model may be obtained by apply a degree of curvature and/or scaling on of the preset sub-model. Further, the terminal 21 joins the target sub-models corresponding to the target points to form a virtual model. The virtual model may appear similar to a horn, as shown in FIG. 3.

In an example, the terminal 21 may display the virtual model similar to a horn at a first position in the image of the human face. The first position may be a preset position or a random position. A specific form of the virtual model is not limited here, and other forms of the virtual model are possible in other embodiments, for example. In FIG. 3, numeral 22 indicates the first position ($\mu$, $v$), where ($\mu$, $v$) may represents coordinates of the first position in a coordinate system for the human face; and numeral 23 indicates the virtual model attached to the first position ($\mu$, $v$). In an example, the terminal 21 may overlap a center of a bottom surface of the virtual model 23 to the first position 22 on the human face. A point at the first position 22 may specifically be a key point on the human face. In addition, an orientation of the key point in the three-dimensional space is consistent with a Y-axis of a model coordinate system where the virtual model 23 is located. A direction of the Y-axis of the model coordinate system may pass through the center of the bottom surface of the virtual model 23 and be perpendicular to the bottom surface.

In an embodiment, after attaching the virtual model 23 to the first position 22 of the human face, the terminal 21 may further determine a second position 24 on the human face that is symmetrical to the first position 22. The second position may be specifically represented as ($1-\mu$, $v$), where ($\mu$, $v$) and ($1-\mu$, $v$) both indicate coordinates in the coordinate system for the human face. Further, the virtual model 23 may be referred to as a first virtual model. The terminal 21 may display, at the second position ($1-\mu$, $v$), a second virtual model that is a mirror of the virtual model 23. The second virtual model may be the virtual model 25 shown in FIG. 3.

Figure 4:
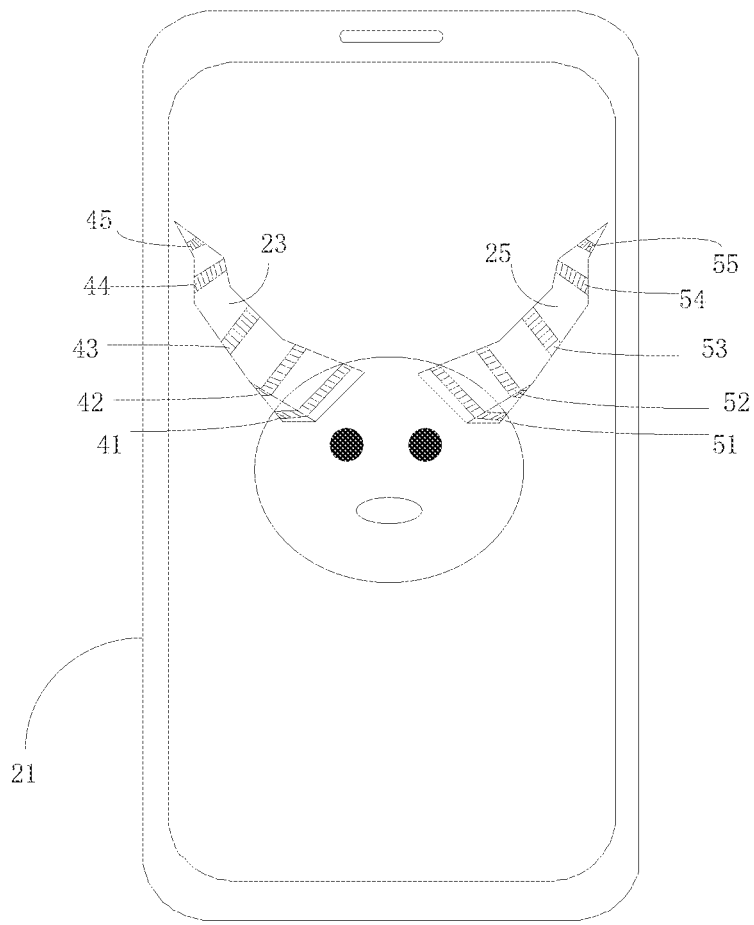
FIG. 4 is a schematic diagram of a virtual model according to another embodiment of the disclosure.

In an embodiment of the present disclosure, the virtual model 23 and/or the virtual model 25 may include at least one preset area. The preset area may specifically be a light-emitting area, which may be referred to as a light band. Reference is made to FIG. 4, in which numerals 41 to 45 represent preset areas on the virtual model 23, and numerals 51 to 55 represent preset areas on the virtual model 25. Different preset areas may present different colors. Alternatively, different preset areas may present a same color. In a case that the virtual model 23 and the virtual model 25 are mirror images of each other, preset areas symmetrical to each other on respective virtual models 23 and 25 may preset a same color or different colors. For example, a preset area 41 and a preset area 51 are symmetrical to each other, and may present a same color or different colors. Schematic illustration here is made taking an example in which the preset areas symmetrical to each other present a same color.

In an embodiment of the present disclosure, the parameter of the virtual model may specifically include a parameter of the virtual model itself and/or a parameter of a preset area on the virtual model. For example, the parameter of the virtual model itself may include a shape, a dimension, a color, and the like of the virtual model, where the color of the virtual model itself is referred to as a first color. Specifically, the color of the virtual model itself may refer to a color of the virtual model before rendering the preset area on the virtual model. In addition, the color of the virtual model itself may be referred to as a base color. In order to be distinguishing from the base color, a color of each preset area on the virtual model may be referred to as a second color. The second color may be superimposed on the base color. That is, a color presented by the preset area on the screen may be a color obtained after the second color of the preset area is superimposed on the base color.

In an example, the parameter of the preset area on the virtual model may include: a position, a width, a moving speed, a second color, and the like, of the preset area. The position of the preset area may specifically refer to a position at which the preset area is located on the virtual model. The position at which the preset area is located on the virtual model may be indicated by a vertex color corresponding to the preset area. In an embodiment, the vertex color may be indicated by values of points at specific positions on an upper surface and lower surface of the preset area.

Figure 5:
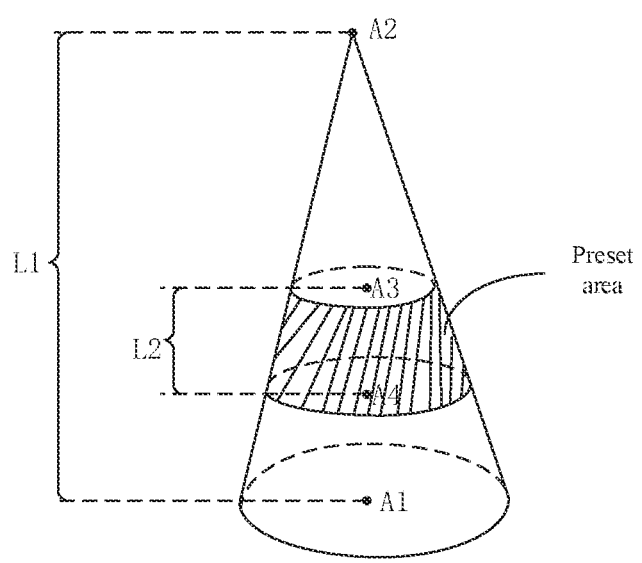
FIG. 5 is a schematic diagram of a virtual model according to another embodiment of the present disclosure.

A specific form of the virtual model is not limited in the embodiments. In the following, a virtual model (such as a cone) simpler than the virtual model shown in FIG. 3 or FIG. 4 is used to provide an illustration of the parameter of the preset area and facilitate understanding of the parameter. Reference is made to FIG. 5, which shows a cone as a virtual model in another form. A center of a lower surface of the virtual model is A1, and a top vertex of the virtual model is A2. A position of A1 may be marked with a value of 0, and a position of A2 may be marked with a value of 1. The shadowed area in FIG. 5 may be any preset area on the virtual model in the form of a cone. A center of an upper surface of the preset area is A3, and a center of a lower surface of the preset area is A4. A3 and A4 are on the line connecting A1 and A2. In addition, there are other points on the line connecting A3 and A4, and values corresponding to the points on the line continuously increase along a direction from A1 to A2. The value corresponding to a point on the line is related to a distance from the point to A1. For example, a point farther from A1 corresponds to a larger value. In addition, the value corresponding to any point on the line is in a range of [0, 1]. For example, in a case that A4 corresponds to a value of 0.2 and A3 corresponds to a value of 0.4, then the vertex color corresponding to the preset area shown in FIG. 5 is denoted as L2, where L2 is in a range of [0.2, 0.4]. The vertex color of the virtual model is denoted as L1, and L1 is in a range of [0, 1].

Figure 6:
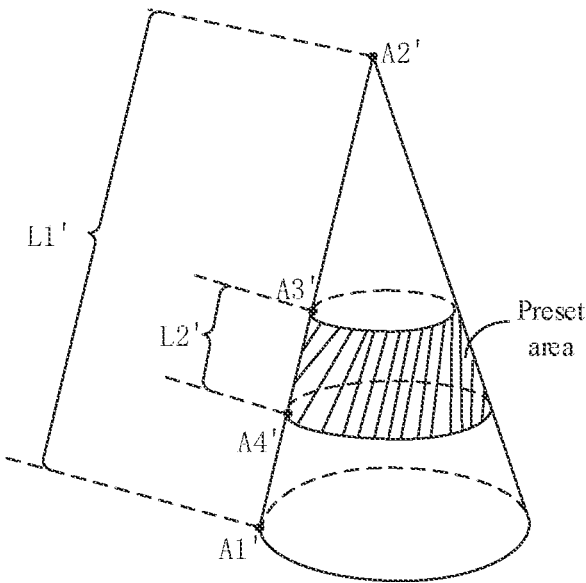
FIG. 6 is a schematic diagram of a virtual model according to another embodiment of the present disclosure.

In an alternative embodiment, the vertex color of the virtual model shown in FIG. 5 may depend on A1' and A2' shown in FIG. 6, and the vertex color of the preset area may depend on A3' and A4' shown in FIG. 6. Specifically, A1' corresponds to a value of 0, and A2' corresponds to a value of 1. A value corresponding to A3' is related to a distance from A3' to A1', and a value corresponding to A4' is related to a distance from A4' to A1'. For example, in a case that A4' corresponds to a value of 0.2 and A3' corresponds to a value of 0.4, then the vertex color corresponding to the preset area is denoted as L2', where L2' is in a range of [0.2, 0.4]. The vertex color of the virtual model is denoted as L1', and L1' is in a range of [0, 1].

In addition, on the basis of FIG. 5 or FIG. 6, a width of the preset area may be defined as a distance between points representing vertex colors in the preset area. For example, the width of the preset area is equal to a distance between A3 and A4 as shown in FIG. 5, or a distance between A3' and A4' as shown in FIG. 6.

In addition, on the basis of FIG. 5 or FIG. 6, the preset area may move on the virtual model, or may remain stationary on the virtual model. A position of the preset area before moving on the virtual model is an initial position of the preset area on the virtual model. When the preset area moves on the virtual model, a moving speed of the preset area is not equal to 0, and the preset area is at different positions at different times. When the preset area remains stationary on the virtual model, the moving speed of the preset area is 0, and the preset area is at a same position at different times.

Therefore, a calculation of the vertex color corresponding to each preset area shown in FIG. 4 is similar to a calculation of the vertex color corresponding to the preset area shown in FIG. 5 or FIG. 6, and is not repeated here. The width of each preset area as shown in FIG. 4 may be calculated in a similar manner as shown in FIG. 5 or FIG. 6. In addition, moving speeds of preset areas shown in FIG. 4 may be the same or different. Second colors of preset areas as shown in FIG. 4 may be the same or different.

In an embodiment of the present disclosure, the terminal 21 may adjust the parameter of the virtual model 23 and/or the virtual model 25 shown in FIG. 4 based on tone, volume, accent, spectral intensity, and other attributes, of the audio information.

Hereinafter, an illustrative description is made by taking an example in which the terminal 21 adjusts the parameter of the virtual model 23 shown in FIG. 4 based on the tone, the volume, the accent, the spectral intensity, and other attributes, of the audio information. The parameter of the virtual model 23 includes: the first color of the virtual model 23 (that is, the base color), and the position, the width, the moving speed, the second color, and the like, of each preset area on the virtual model 23. It may be understood that the attribute of the audio information may change over time, for example, in real time. Therefore, by adjusting the parameter of the virtual model 23 based on the attribute of the audio information, a change of the parameter of the virtual model 23 with the change of the attribute of the audio information may be realized, and thus a real-time change of the virtual model 23 is realized.

The audio information has multiple attributes, and the virtual model 23 has multiple parameters. A correspondence between the attributes of the audio information and the parameters of the virtual model 23 is not limited when adjusting the parameters of the virtual model 23 based on the attributes of the audio. For example, one parameter of the virtual model 23 may be adjusted based on a single attribute of the audio information or multiple attributes of the audio information.

In S103, the virtual model is displayed in the target image based on the parameter of the virtual model after the adjustment.

In an implementation, in a case that a virtual model 23 is previously displayed in the image of a human face, the terminal 21 may, after adjusting the parameter of the virtual model 23 based on an attribute of the audio information, update the virtual model 23 in the image (that is, display the virtual model after the adjustment) based on the adjusted parameter. Since the parameter of the virtual model 23 after the adjustment changes with time, the virtual model 23 displayed in the target image (such as the image of the human face) changes with time.

In another implementation, in a case that the virtual model 23 is not previously displayed in the image of the human face, the terminal 21 may, after adjusting the parameter of the virtual model 23 based on an attribute of the audio information, generate the virtual model 23 based on the parameter of the virtual model 23 after the adjustment, and display the virtual model 23 in the image of the human face.

It may be understood that, in a case that the parameter of the virtual model 23 changes in real time with the attribute of the audio information, the virtual model 23 on the image of the human face may also change in real time. For example, a base color of the virtual model 23 may be changed in real time, and a position, a width, a moving speed, a second color, and the like, of each preset area on the virtual model 23 may also be changed in real time. In addition, a quantity of preset areas to be displayed on a single virtual model is not limited in the embodiments of the present disclosure. For example, the quantity of preset areas may be determined by a user or based on a dimension or shape of the virtual model, or may be preset.

With the method for processing a virtual model provided in the embodiments of the present disclosure, a parameter of the virtual model is adjusted based on an attribute of audio information. Since the attribute of audio information may change with time, the parameter of the virtual model may change with time after adjusting the parameter of the virtual model based on the attribute of the audio information. Further, in response to the parameter of the virtual model changing with time, the virtual model displayed in the target image changes accordingly. That is to say, the virtual model displayed in the target image may change with the change of the audio information, and change of the audio information may be visually reflected through the virtual model. Hence, a linkage between a visual presentation and an audio presentation is achieved, and flexibility in presenting the virtual model is improved.

On the basis of the above embodiments, several implementations of adjusting the parameter of the virtual model based on the attribute of the audio information are described below.

In an implementation, adjusting the parameter of the virtual model based on the attribute of the audio information includes: adjusting the speed at which the preset area moves on the virtual model based on the tone of the audio information.

For example, the tone of the audio information may be denoted as tone, and the speed at which the preset area moves on the virtual model may be denoted as speed. In an example, the terminal 21 may adjust the speed at which the preset area moves on the virtual model based on the tone of the audio information. A relationship between the tone and the speed may be expressed as formula (1):

$$\text{speed} = \text{mix}\left(2.0, 10.0, \text{clamp}\left(\frac{\text{tone}}{255.0}, 0.0, 1.0\right)\right) \quad (1)$$

In formula (1), 2.0 represents a minimum value of the speed, 10.0 represents a maximum value of the speed, 255.0 represents a maximum estimated value of the tone; and therefore $$\frac{\text{tone}}{255.0}$$

ranges from 0 to 1. In addition, 0.0 and 1.0 are used to further guarantee that $$\frac{\text{tone}}{255.0}$$

ranges from 0 to 1. The item clamp represents a function that has 3 input parameters, i.e., x, 0.0, and 1.0 in the listed-order. The clamp (x, 0.0, 1.0) defines that: 0 is outputted in response to x being less than 0; 1 is outputted in response to x being greater than 1; and x is outputted in response to $0 \leq x \leq 1$, where x may correspond to different expressions in different scenarios. In this embodiment, x corresponds to tone $$\frac{\text{tone}}{255.0}.$$

It may be understood that some real numbers, such as 2.0, 10.0, 255.0, 0.0, 1.0, and the like, described for formula (1) may be illustrative in an embodiment. These real numbers may be schematically adjusted in different application scenarios, and are not limited herein.

In another implementation, adjusting the parameter of the virtual model based on the attribute of the audio information includes: adjusting the first color of the virtual model based on the tone, the volume, and the accent of the audio information.

For example, the tone of the audio information may be denoted as tone, the volume of the audio information may be denoted as volume, and the accent of the audio information may be denoted as onset. In an example, the terminal 21 may adjust the first color, i.e., the base color (denoted as albedoColor), of the virtual model based on the tone (denoted as tone) of the audio information, the volume (denoted as volume) of the audio information, and the accent (denoted as onset) of the audio information. A relationship of tone, volume, onset, and albedoColor may be expressed as formula (2):

$$albedoColor = \text{float4}(\frac{\text{tone}}{255.0}, \frac{\text{volume}}{255.0}, \frac{\text{onset}}{255.0}, 1.0) \quad (2)$$

In formula (2), float4 indicates that a 4-dimensional vector RGBA (red, green, blue, and transparency) is formed by $$\frac{tone}{255.0}, \frac{volume}{255.0}, \frac{onset}{255.0}, 1.0$$

The 255.0 in $$\frac{tone}{255.0}$$

represents a maximum estimated value of tone, the 255.0 in volume/255.0 represents a maximum estimated value of volume, the 255.0 in $$\frac{onset}{255.0}$$

represents a maximum estimated value of onset, and the 1.0 represents a transparency. Each of the $$\frac{tone}{255.0}, \frac{volume}{255.0}$$

and the $$\frac{onset}{255.0}$$

ranges from 0 to 1.

It may be understood that some real numbers in formula (2), for example, 255.0, 1.0, and the like, may be illustrative in this embodiment. These real numbers may be adjusted in different application scenarios, and are not limited here.

In yet another implementation, adjusting the parameter of the virtual model based on the attribute of the audio information includes: adjusting the second color of the preset area on the virtual model based on the spectral intensity of the audio information.

For example, the second color of a preset area may be denoted as BandColor. The BandColor may be determined based on an initial color and a spectral intensity of the audio information. For example, the initial color is denoted as ArtistColor, and the spectral intensity of the audio information is denoted as SpectrumIntensity. In an example, the spectrum intensity of the audio information may be obtained after analyzing a spectrum of the audio information. The spectral intensity of the audio information may be an array, for example, SpectrumIntensity[i] represents the intensity of an i-th spectrum. Since a virtual model may include multiple preset areas, the second colors of the multiple preset areas may be distinguished from each other. For example, the second color of the i-th preset area is denoted as BandColor[i]. The BandColor[i] may be determined by formula (3):

$$BandColor[i]=ArtistColor[i]*SpectrumIntensity[i] \quad (3)$$

In formula (3). ArtistColor[i] represents an initial color of the i-th preset area. In an embodiment, SpectrumIntensity[i] may further represent the spectral intensity corresponding to the i-th preset area. For example, the spectral intensity corresponding to the i-th preset area may vary with time, and therefore the second color of the i-th preset area may change continuously. In addition, the initial color of the i-th preset area may be preset. A process of adjusting the second color of the i-th preset area based on the spectral intensity of the audio information may specifically implemented by adjusting a brightness of the second color, so that the brightness of the second color can change with the change of the spectral intensity. For example, the initial color of the i-th preset area is red. The second color of the i-th preset area may be bright red in a case that the spectral intensity of the audio information is relatively large. The second color of the i-th preset area may be dark red in a case that the spectral intensity of the audio information is relatively small. Different preset areas may have a same initial color or different initial colors.

In a further implementation, adjusting the parameter of the virtual model based on the attribute of the audio information includes: adjusting a width of the preset area on the virtual model based on an accent of the audio information.

For example, the width of the preset area is denoted as lineWidth. Adjustment of the width of the preset area based on the accent (onset) of the audio information may be implemented based on formula (4):

$$lineWidth = 0.03 * \min(5.0, \max(1.0, \frac{onset}{60.0})). \quad (4)$$

In formula (4), 0.03 represents an initial width of the preset area, 60.0 represents a scaling value for scaling the input accent, and 5.0 and 1.0 are set for a minimum value function min and a maximum value function max, in order to control the $$\frac{onset}{60.0}$$

in a range from 1.0 to 5.0.

It can be understood that some real numbers described in formula (4), for example, 0.03, 5.0, 60.0, 1.0, and the like, may be illustrative in this embodiment. These real numbers may be adjusted in different application scenarios, and are not limited here. Specifically, the real numbers in the above formulas (1), (2) and (4) may be empirical parameters, and may be determined, for example, based on a value range of the attribute of the audio information.

In yet another implementation, adjusting the parameter of the virtual model based on the attribute of the audio information includes: adjusting a speed at which the preset area moves on the virtual model based on the tone of the audio information; and adjusting a position of the preset area based on the speed at which the preset area moves on the virtual model and an initial position of the preset area on the virtual model.

For example, the initial position of the preset area on the virtual model may be denoted as linePos, and the speed at which the preset area moves on the virtual model may be denoted as speed. In response to the speed being not 0, the position of the preset area on the virtual model may change in real time. For example, a current position of the preset area on the virtual model is denoted as linePos' and there has linePos'=linePos+time*speed, where time represents a time interval. Change of the speed with the audio information is as described above, and is not repeated here.

In the above embodiments of the present disclosure, the speed at which the preset area moves on the virtual model is adjusted based on the tone of the audio information: the first color of the virtual model is adjusted based on the tone, the volume and the accent of the audio information: the second color of the preset area is adjusted based on the spectral intensity of the audio information; the width of the preset area on the virtual model is adjusted based on the accent of the audio information; a position of the preset area is adjusted based on the speed at which the preset area moves on the virtual model and the initial position of the preset area on the virtual model. Hence, the parameters of the preset area can change with the attributes of the audio information. The attributes of the audio information are presented in a visual form of 3D rendering. Thereby, a visual performance of the virtual model may change with the audio information, so as to improve a flexibility of a representation of the virtual model.

Figure 7:
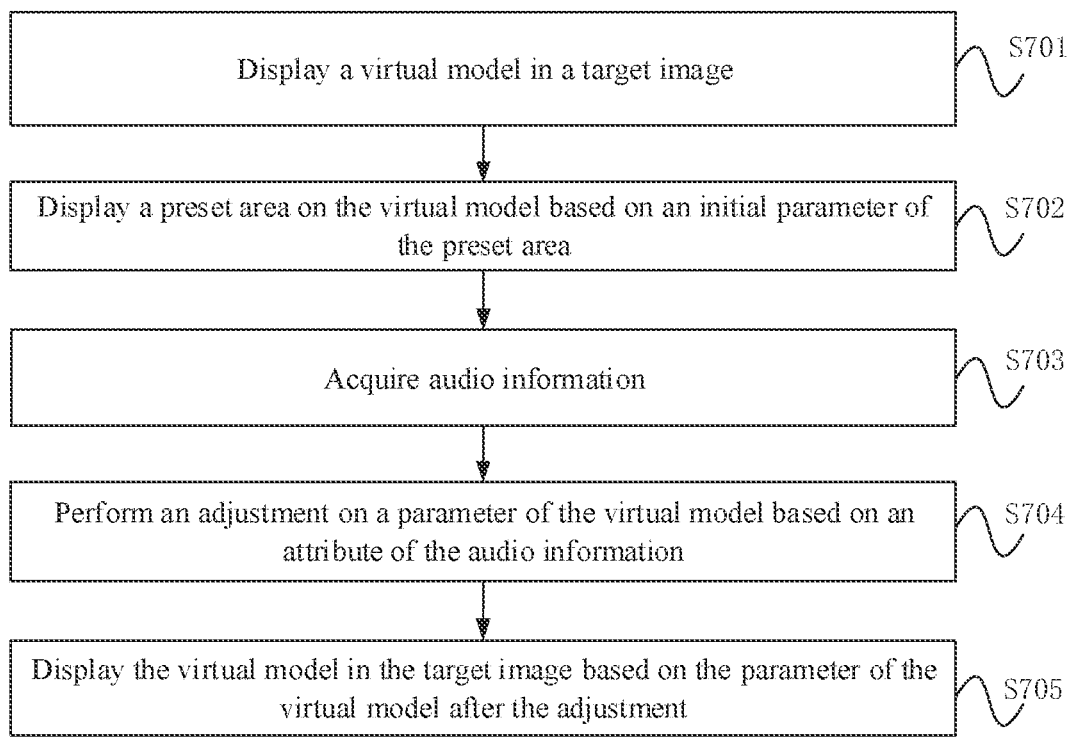
FIG. 7 is a flowchart of a method for processing a virtual model according to another embodiment of the present disclosure.

FIG. 7 is a flowchart of a method for processing a virtual model according to another embodiment of the present disclosure. On the basis of the above embodiments, the method for processing a virtual model is further described in details in this embodiment. As shown in FIG. 7, the method in this embodiment is applicable to a terminal, and specifically includes steps S701 to S705.

In step S701, a virtual model is displayed in a target image.

As mentioned with reference to FIG. 3, the terminal 21 may display the virtual model 23 and the virtual model 25 in the target image. The target image includes, for example, an image of a human face or other target objects.

In S702, a preset area is displayed on the virtual model based on an initial parameter of the preset area.

In this embodiment, the preset area on the virtual model may have an initial parameter. The initial parameter of the preset area may include: an initial position, an initial width, an initial moving speed, and an initial color of the preset area. The initial position of the preset area may specifically refer to an initial position of the preset area on the virtual model. The initial moving speed of the preset area may specifically refer to an initial speed at which the preset area moves on the virtual model. In an example, the initial parameter of the preset area may be pre-configured by the terminal 21. Alternatively, the initial parameter of the preset area may be set by a user. For example, an icon or button for parameter configuration may be displayed on a user interface of the terminal 21, and the terminal 21 may determine the initial parameter of the preset area in response to a user operation on the icon or button. In an example, the user may not only configure a quantity of preset areas, but also set the initial parameter of the preset area. Further, the terminal 21 may display the preset area on the virtual model based on the initial parameter of the preset area. As shown in FIG. 4, on the basis of FIG. 3, the terminal 21 may display the preset area on the virtual model based on the initial parameter of the preset area. In an example, a process of displaying the preset area on the virtual model by the terminal 21 may specifically be rendering of the preset area, such as a light band.

In S703, audio information is acquired.

An implementation and specific principle of S703 is the same as the S101, and is not repeated here.

In S704, a parameter of the virtual model is adjusted based on an attribute of the audio information.

For example, the terminal 21 adjusts the parameter of the virtual model 23 and/or the virtual model 25 as shown in FIG. 4, based on the attribute of the audio information. The parameter of the virtual model 23 includes a base color of the virtual model 23, and a position, width, moving speed, second color, and the like, of a preset area on the virtual model 23. The parameter of the virtual model 25 includes a base color of the virtual model 25, and a position, width, moving speed, second color, and the like, of a preset area on the virtual model 25. Thereby, the parameter of the virtual model 23 and/or the virtual model 25 can be changed with change of the audio information.

An implementation and specific principle of S704 may refer to the implementations described in the foregoing embodiments, which is not repeated here.

In S705, the virtual model is displayed in a target image based on the parameter of the virtual model after the adjustment.

In an example, displaying the virtual model in the target image based on the parameter of the virtual model after the adjustment includes: updating the virtual model in the target image based on the parameter of the virtual model after the adjustment.

For example, on the basis of FIG. 4, when the parameter of the virtual model 23 and/or the virtual model 25 are changed, the terminal 21 may update the virtual model 23 and/or the virtual model 25 in the image of the human face based on the parameter of the virtual model 23 and/or the virtual model 25 after updating.

Thereby, the base color of the virtual model 23 and/or the virtual model 25 displayed in the image, and the position, width, moving speed, color, and the like, of the preset area on the virtual model 23 and/or the virtual model 25 can change with the audio information.

Alternatively, the method further includes: smoothing a brightness of the preset area based on the initial parameter of the preset area.

In an implementation, after S702, the brightness of the preset area is smoothed based on the initial parameter of the preset area. For example, as shown in FIG. 4, after displaying the preset area on the virtual model 23 and/or the virtual model 25 based on the initial parameter of the preset area, the terminal 21 may further smooth the brightness of the preset area based on the initial parameter of the preset area.

In another implementation, S702 may specifically include: smoothing a brightness of the preset area based on an initial parameter of the preset area; and displaying the preset area on the virtual model. For example, as shown in FIG. 3, after displaying the virtual model 23 and the virtual model 25 in the image of the human face, the terminal 21 may perform a smoothing process on the brightness of the preset area based on the initial parameter of the preset area, and then display the preset area on the virtual model 23 and the virtual model 25 based on the initial parameter of the preset area and smoothed brightness of the preset area.

Figure 8:
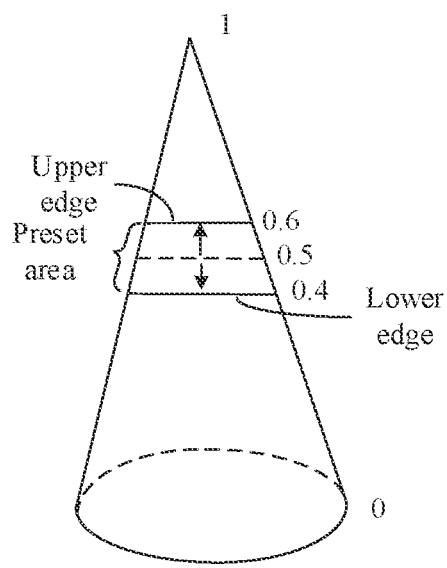
FIG. 8 is a schematic diagram of a virtual model according to another embodiment of the disclosure.

The following description is made taking the virtual model 23 as an example, in order to introduce a process of smoothing the brightness of the preset area on the virtual model 23. For example, multiple preset areas may be displayed on the virtual model 23. An initial position of a preset area on the virtual model 23 is denoted as linePos, an initial width of the preset area is denoted as lineWidth0, and an initial color of the preset region is denoted as BandColor0, where BandColor0 may be the same as the ArtistColor described above. The initial moving speed of the preset area on the virtual model 23 is denoted as speed0. Further, the terminal 21 performs a smoothing processing on the brightness of the preset area based on the initial parameter of the preset area, such as the linePos, lineWidth0, BandColor0, and speed0. The linePos, lineWidth0, BandColor0, and speed0 may have fixed values. Reference is made to FIG. 8. The dotted line represents a center line of the preset area, and the smoothing process on the brightness of the preset area may implemented by smoothing the brightness from the center line in the preset area to an edge of the preset area.

In an example, smoothing the brightness of the preset area based on the initial parameter of the preset area includes: performing a first smoothing process on the brightness of the preset area based on an initial width of the preset area and an initial position of the preset area; and performing a second smoothing process on the brightness of the preset area based on a result after the first smoothing process and a preset smoothing parameter.

For example, the terminal 21 may perform the first smoothing process on the brightness of the preset area based on the initial width lineWidth0 of the preset area and the initial position linePos of the preset area on the virtual model 23. A result after the first smoothing process is denoted as OutputBand1. The OutputBand1 is calculated through formula (5):

$$OutputBand1 = smoothstep(linePos - \frac{lineWidth}{2}, linePos, x) - smoothstep(linePos, linePos + \frac{lineWidth}{2}, x). \quad (5)$$

In formula (5), there has lineWidth=lineWidth0; and x represents geometric information of the virtual model, such as texture coordinates, vertex colors, and the like. In an embodiment, x may specifically represent the vertex color of the virtual model 23, for example, [0, 1]. The smoothstep represents a function for smoothing the brightness of the preset area. The smoothstep may be a general calculation function with 3 input parameters, in which a first input parameter is denoted as a, a second input parameter is denoted as b, and a third input parameter is denoted as t, for example. The variables a, b, and t may be understood as input parameters for the smoothstep function without loss of generality. In different scenarios, each of a, b, t may represent different meanings or expressed as different expressions. The smoothstep may be expressed by formula (6):

$$smoothstep(a, b, t) = 3m^2 - 2m^3, m = \max(0, \min(1, \frac{t-b}{b-a})). \quad (6)$$

For $$smoothstep(linePos - \frac{lineWidth}{2}, linePos, x)$$

in formula (5), $$linePos - \frac{lineWidth}{2}$$

corresponds to a, linePos corresponds to b, and x corresponds to t.
For $$smoothstep(linePos - \frac{lineWidth}{2}, linePos, x)$$

in formula (5), linePos corresponds to a, $$linePos + \frac{lineWidth}{2}$$

corresponds to b, and x corresponds to 1.

For example, the initial position of the preset area on the virtual model shown in FIG. 8 may be a centerline position of the preset area. In addition, a bottom position of the virtual model shown in FIG. 8 may be represented by 0, a top position of the virtual model may be represented by 1, and the centerline position may be represented by 0.5. The initial width of the preset area is, for example, 0.2, then a position of an upper edge of the preset area can be represented by 0.6, and a position of a lower edge of the preset area may be represented by 0.4.

Figure 9:
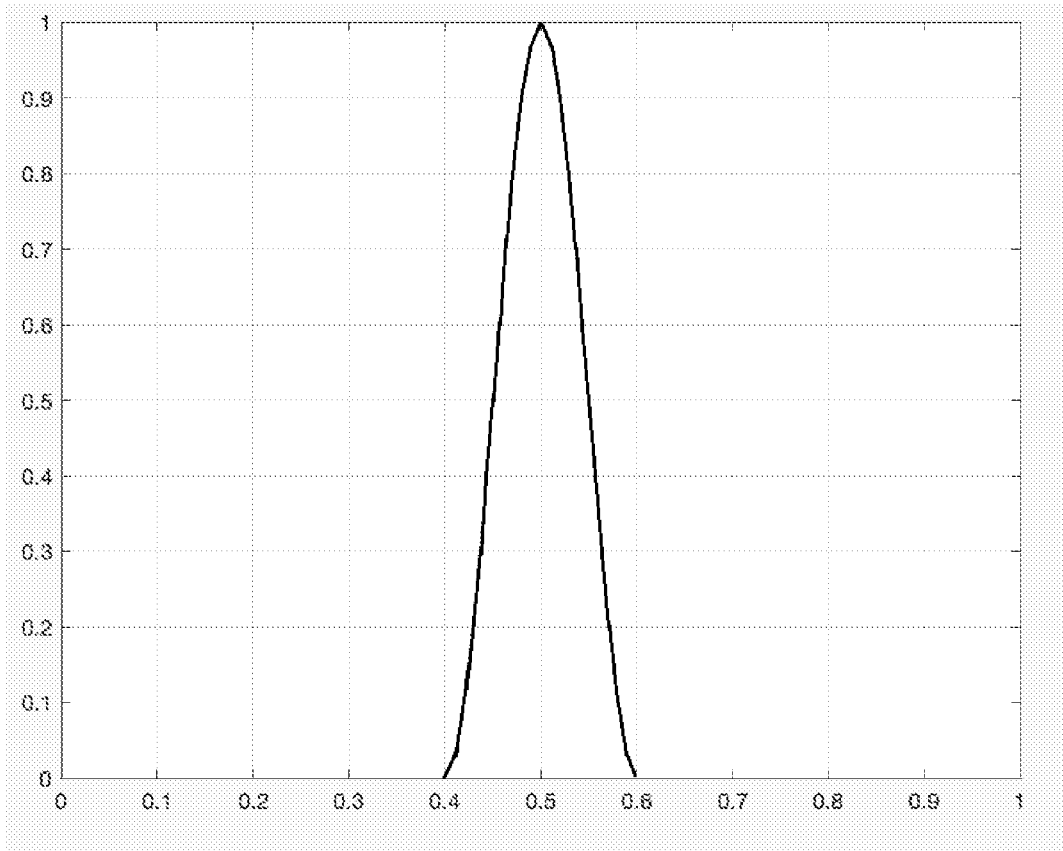
FIG. 9 is a schematic diagram of a brightness smoothing effect according to an embodiment of the present disclosure.

The result OutputBand1 of the first smoothing process may be represented as a curve as shown in FIG. 9. Specifically, a horizontal axis of the coordinate system shown in FIG. 9 represents the vertex color of the virtual model, ranging from 0 to 1, in which a range of 0.4 to 0.6 is the vertex color corresponding to the preset area shown in FIG. 8. A vertical axis of the coordinate system represents brightness. The curve shown in FIG. 9 indicates changes of the brightness from the centerline position 0.5 of the preset area to the upper edge position 0.6 and the lower edge position 0.4 of the preset area. For example, the brightness of the preset area is greatest at the centerline position 0.5, and gradually decreases from the centerline position 0.5 to the upper edge position 0.6 or the lower edge position 0.4.

Further, on the basis of the first smoothing result OutputBand1, a second smoothing process may be performed on the brightness of the preset area based on a preset smoothing parameter y and the initial color BandColor0 of the preset area. Specifically, the second smoothing process may smooth a color brightness of the preset area. That is, after the second smoothing process, the color brightness of different positions in the preset area is a result of the second smoothing process. The result of the second smoothing process is denoted as OutputBand2. The OutputBand2 is calculated through formula (7):

$$OutputBand2=pow(OutputBand1,y) \cdot BandColor \quad (7)$$

In formula (7), there has BandColor=BandColor0. The preset smoothing parameter y is used to control an edge brightness smoothing effect of the preset area. The pow (OutputBand1,y) represents a result of smoothing the brightness of the preset area again using the preset smoothing parameter y based on the first smoothing result OutputBand1, where pow represents a smoothing function. The pow(OutputBand1,y) is multiplied with the initial color BandColor0 so as to realize a distribution of the brightness of the initial color BandColor0 in accordance with pow (OutputBand1,y) in the preset area.

Figure 10:
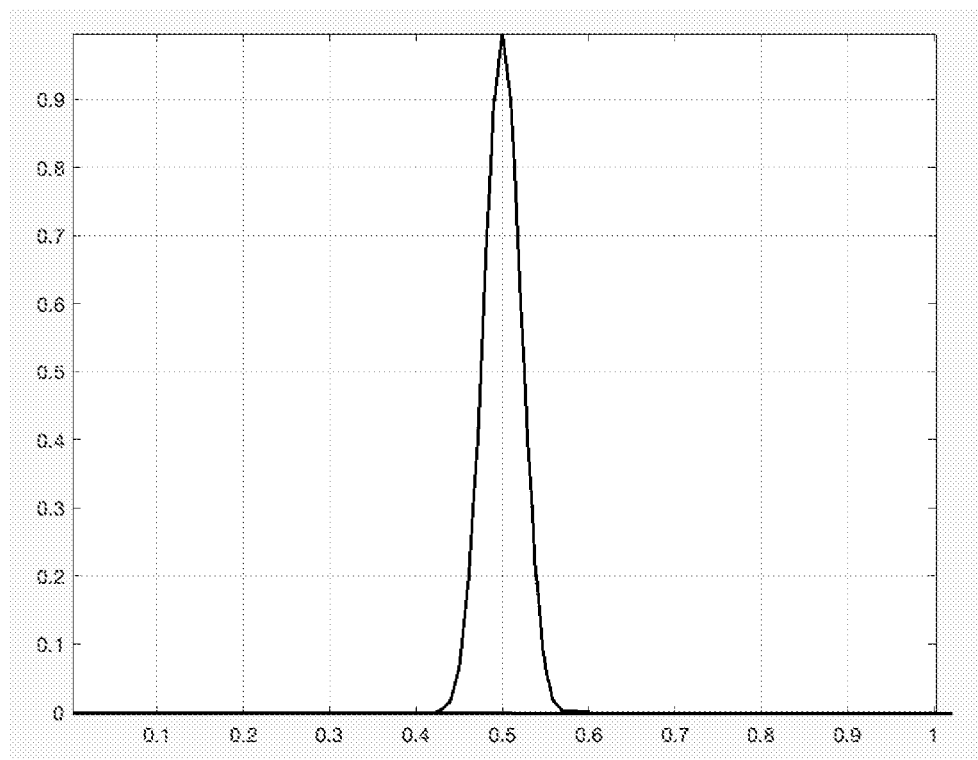
FIG. 10 is a schematic diagram of a brightness smoothing effect according to another embodiment of the disclosure.

In a case that y is greater than 1, the result pow(OutputBand1,y) after smoothing the brightness of the preset area again may be expressed as a curve as shown in FIG. 10. Compared with the OutputBand1 after the first smoothing process, the brightness shown in FIG. 10 changes slower and smoother from the centerline position 0.5 to the upper edge position 0.6 or the lower edge position 0.4, especially in regions close to the upper edge position 0.6 or the lower edge position 0.4.

Figure 11:
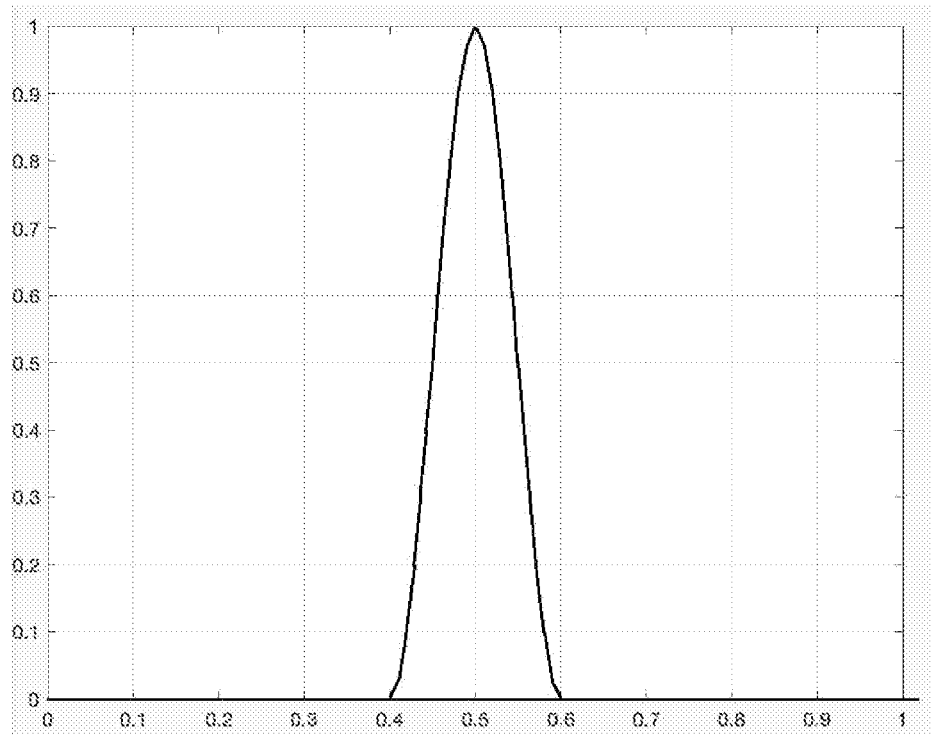
FIG. 11 is a schematic diagram of a brightness smoothing effect according to another embodiment of the disclosure.

In a case that y is equal to 1, the result pow(OutputBand1, y) after smoothing the brightness of the preset area again may be expressed as a curve as shown in FIG. 11. In such case, a smoothing effect of pow(OutputBand1,y) is substantially the same as a smoothing effect of the first smoothing result OutputBand1.

Figure 12:
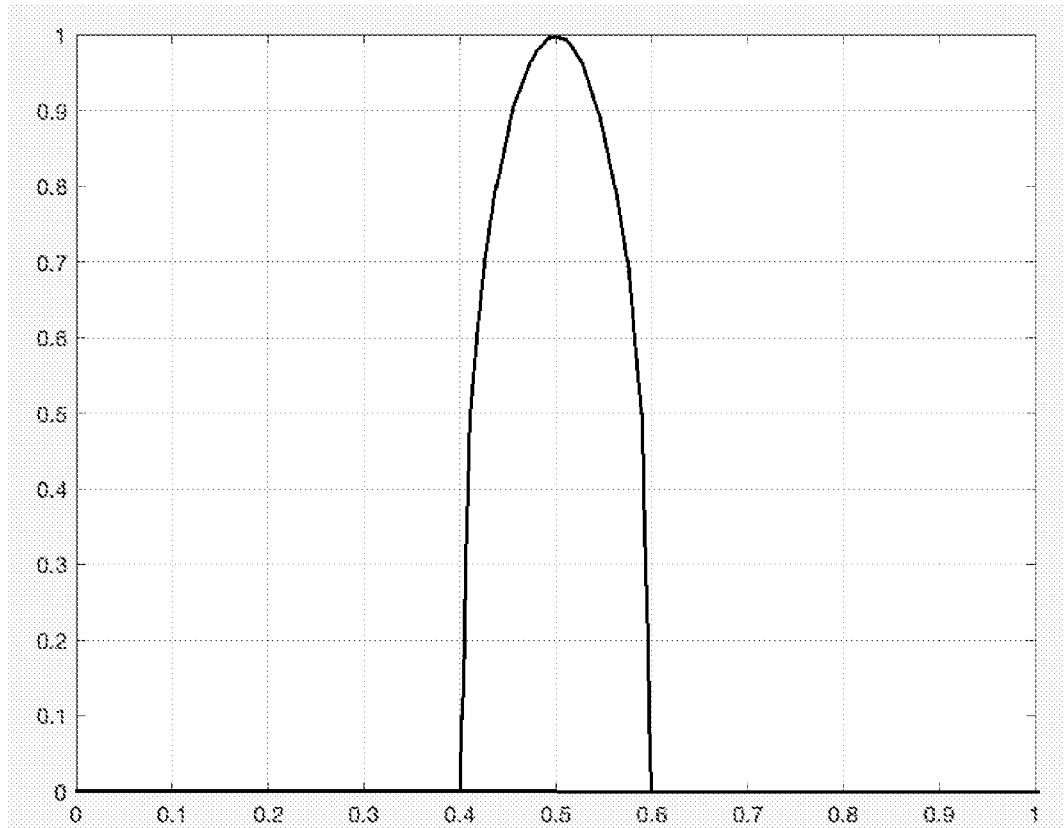
FIG. 12 is a schematic diagram of a brightness smoothing effect according to another embodiment of the disclosure.

In a case that y is less than 1, the result pow(OutputBand1,y) after smoothing the brightness of the preset area again may be expressed as a curve as shown in FIG. 12. Compared with the OutputBand1 after the first smoothing process, the brightness shown in FIG. 12 changes faster from the centerline position 0.5 to the upper edge position 0.6 or the lower edge position 0.4, especially in regions close to the upper edge position 0.6 or the lower edge position 0.4. In this case, edges of the preset area are sharper.

Based on FIG. 10 to FIG. 12, y may affect a transition speed of the brightness. For example, the transition of brightness is slow in a case that y is greater than 1, and the transition of brightness is fast in a case that y is less than 1. In addition, y may have a certain influence on the width of the preset area while affecting the transition speed of the brightness. That is, the width of the preset area actually presented may depend on both lineWidth and y. Alternatively, the width of the preset area actually presented may depend on both the initial width line Width0 and y.

Since OutputBand1 does not include information of color and OutputBand2 includes information of color, OutputBand2 can present a color effect of the preset area, such as color brightness. For example, assuming that the initial color BandColor0 of the preset area is red, after processed by formula (7), the centerline position of the preset area becomes bright red, and an upper edge position and a lower edge position of the preset area are dark red. A brightness of the red color gradually decreases from the centerline position of the preset area to the upper edge position and the lower edge position of the preset area, and conforms to the curve represented by OutputBand2.

After the smoothing process on the brightness of the preset area based on the above formula (5) and formula (7), in a case that the initial moving speed of the preset area is 0, the preset area displayed by the terminal 21 on the virtual model 23 may be stationary. That is, the preset area is displayed on the virtual model 23 in a stationary manner with the preset initial position, the initial width, the initial color, and the brightness after the smoothing processes in accordance with formula (5) and formula (7).

In another embodiment, the preset area may be non-stationary. For example, in a case that the initial moving speed of the preset area is not 0, the performing the first smoothing process on the brightness of the preset area based on the initial width of the preset area and the initial position of the preset area includes: performing the first smoothing process on the brightness of the preset area based on the initial width of the preset area, the initial position of the preset area, and an initial moving speed of the preset area.

For example, in a case that the initial moving speed of the preset area is not 0, the initial moving speed speed0 of the preset area may be introduced on the basis of formula (5). In this case, the first result OutputBand1 may be calculated through formula (8):

$$OutputBand1 = smoothstep(linePos - \frac{lineWidth}{2}, linePos, input) - \\ smoothstep(linePos, linePos + \frac{lineWidth}{2}, input). \quad (8)$$

In formula (8), there has input=frac(x+time·speed), where input represents an input after modification, time represents a time increment, and the speed here in the input is equal to speed0. A second smoothing process may be further performed on the basis of formula (8). The result after the second smoothing process is denoted as OutputBand2, and OutputBand2 is calculated through formula (9):

$$OutputBand2 = pow(OutputBand1, y) \cdot BandColor \quad (7)$$

In formula (9), OutputBand1 is the same as the OutputBand1 in formula (8), and there has BandColor=BandColor0. Reference may be made to FIG. 10 to FIG. 12 as described above for a relationship between the preset smoothing parameter y and the smoothing effect of pow(OutputBand1,y). The pow(OutputBand1,y) in formula (9) indicates a result of a second smoothing process on the brightness of the preset area with the preset smoothing parameter y, on the basis of the first result OutputBand1 obtained by formula (8). The pow represents a smoothing function. After smoothing the brightness of the preset area using formula (8) and formula (9), since the initial moving speed of the preset area is not 0, the preset area displayed by the terminal 21 on the virtual model 23 moves at the initial moving speed. For example, the preset area moves from a lower portion of the virtual model 23 to an upper portion of the virtual model 23 with the initial moving speed. After reaching the top of the virtual model 23, the preset area may repeatedly move from the lower portion of the virtual model 23 to the upper portion of the virtual model 23. Such repeated movement of the preset area on the virtual model may be a default configuration, that is, the preset area moves repeatedly as configured if the preset area is movable on the virtual model. In addition, the repetition of movement of the preset area on the virtual model may be configured at the same time when the user configures the initial parameter of the preset area. During the movement of the preset area, a width of the preset area remains the initial width, a color of the preset area remains the initial color, and a brightness of the preset area is smoothed by using formula (8) and formula (9).

It can be understood that, with the above method, multiple preset areas can be displayed on the virtual model 23. Each of the preset areas has its own initial position, initial width, initial moving speed, initial color, and other initial parameters.

In the method for processing a virtual model provided by the embodiments of the present disclosure, the brightness of the preset area is smoothed by using the initial parameter of the preset area. Hence, a smooth change of the brightness of the preset area from the centerline position to the upper edge position of the preset area and to the lower edge position of the preset area is realized, so that a visual effect of the preset area is enhanced.

Figure 13:
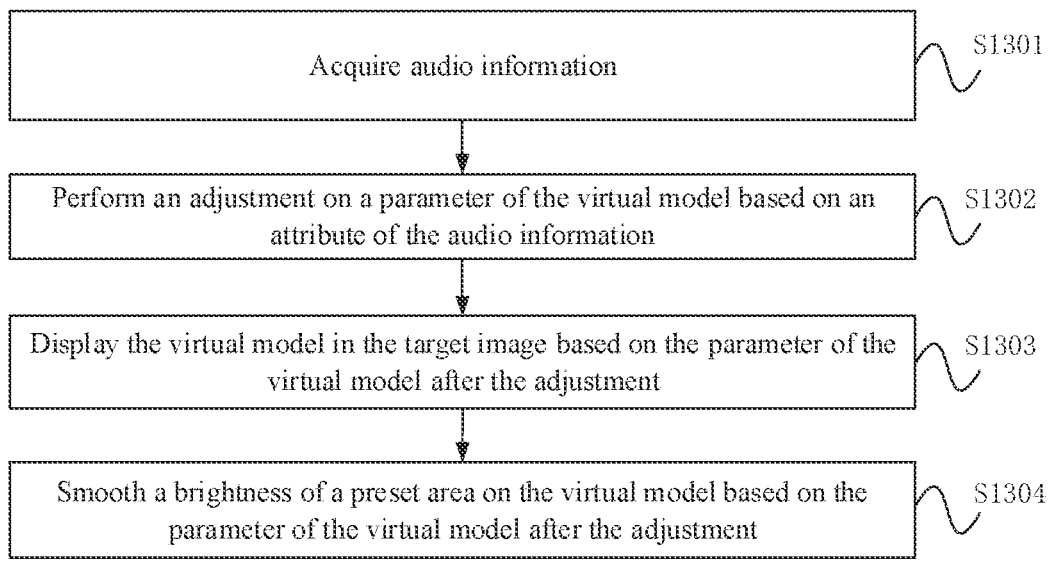
FIG. 13 is a flowchart of a method for processing a virtual model according to another embodiment of the present disclosure.

FIG. 13 is a flowchart of a method for processing a virtual model according to an embodiment of the present disclosure. The method is further illustrated hereinafter on the basis of the above-mentioned embodiments. Reference is made to FIG. 13. The method is applicable to a terminal, and specifically includes S1301 to S1304.

In S1301, audio information is acquired.

Implementations and specific principles of S1301 are the same as those for S101, and are not repeated here. It can be understood that, in an embodiment, S701 and S702 as shown in FIG. 7 may be executed before S1301.

In S1302, a parameter of the virtual model is adjusted based on the attribute of the audio information.

Implementations and specific principles of S1302 may refer to what described in the foregoing embodiments, which are not repeated here.

In S1303, the virtual model is displayed in a target image based on the parameter of the virtual model after the adjustment.

Implementations and specific principles of S1303 may refer to what described in the foregoing embodiments, which are not repeated here.

In S1304, a brightness of a preset area on the virtual model is smoothed based on the parameter of the virtual model after the adjustment.

As can be seen from formula (5), formula (7), formula (8), and formula (9), in response to changes of the parameter of the preset area, such as the width lineWidth, the moving speed speed, the color BandColor, or the like, the result of the first smoothing process and the result of the second smoothing process may change accordingly, that is, a smoothing effect of the brightness of the preset area may change dynamically with the audio information. Changes of the parameter of the preset area and the base color of the virtual model may refer to formula (1) to formula (4).

It can be understood that, in a case that the brightness of the preset area is smoothed based on the initial parameter of the preset area before S1301, the brightness of the preset area may be further smoothed, after S1303, based on the parameter of the preset area after the adjustment. In a case that the brightness of the preset area is not smoothed before S1301 based on initial parameter of the preset area, the brightness of the preset area may still be smoothed after S1303 based on the parameter of the preset area after the adjustment.

In another embodiment, the S1303 of displaying the virtual model in the target image based on the parameter of the virtual model specifically includes: smoothing the brightness of the preset area on the virtual model based on the parameter of the virtual model after the adjustment; and displaying the virtual model in the target image. For example, after adjusting the parameter of the virtual model based on the attribute of the audio information, the terminal may perform a smoothing process on the brightness of the preset area based on the parameter of the preset area after the adjustment. Further, the terminal displays the virtual model based on the parameter of the virtual model after the adjustment and the brightness of the preset area after the smoothing.

In an example, smoothing the brightness of the preset area on the virtual model based on the parameter of the virtual model after the adjustment includes: performing a third smoothing process on the brightness of the preset area on the virtual model based on an initial position of the preset area and a width of the preset area after the adjustment; and performing a fourth smoothing process on the brightness of the preset area on the virtual model based on a result after the third smoothing process and a preset smoothing parameter.

For example, after adjusting the parameter of the virtual model based on the attribute of the audio information, the terminal 21 may perform a smoothing process on the brightness of the preset area based on the parameter of the virtual model after the adjustment. The parameter of the virtual model after the adjustment may include: a base color albedoColor of the virtual model after the adjustment, a moving speed speed of the preset area after the adjustment, a width lineWidth of the adjusted preset area after the adjustment, and a color BandColor of the preset area after the adjustment.

For example, the terminal 21 may perform the third smoothing process on the brightness of the preset area based on the width lineWidth of the preset area after the adjustment and the initial position linePos of the preset area on the virtual model 23. A result after the third smoothing process may refer to formula (5).

Further, on the basis of the result of the third smoothing process, the fourth smoothing process is performed on the brightness of the preset area based on the preset smoothing parameter y and the color BandColor of the preset area after the adjustment. A result after the fourth smoothing process may refer to formula (7).

In an example, performing the third smoothing process on the brightness of the preset area on the virtual model based on the initial position of the preset area and the width of the preset area after the adjustment includes: performing the third smoothing process on the brightness of the preset area on the virtual model based on the initial position of the preset area, the width of the preset area after the adjustment, and the moving speed of the preset area after the adjustment.

For example, the preset area is movable, and the third smoothing process is performed on the brightness of the preset area based on the width lineWidth of the preset area after the adjustment, the moving speed speed of the preset area after the adjustment, and the initial position linePos of the preset area on the virtual model 23. A result after the third smoothing process may refer to formula (8). On the basis of the result of the third smoothing process, the fourth smoothing process is performed on the brightness of the preset area based on the preset smoothing parameter y and the color BandColor of the preset area after the adjustment. A result after the fourth smoothing process may refer to formula (9).

As shown in FIG. 4, the terminal 21 generates five preset areas on the virtual model 23 and five preset areas on the virtual model 25.

Taking the virtual model 23 as an example, in a case that there is no audio information, in response to each of the five preset areas in the on the virtual model 23 being stationary, each of the preset areas may be displayed on the virtual model 23 in a static state with the initial position, the initial width, the initial color, and the brightness being smoothed in accordance with formula (5) and formula (7).

In a case that there is no audio information, in response to each of the five preset areas on the virtual model 23 being movable, each of the preset areas can move on the virtual model 23 at the initial moving speed of the preset area; meanwhile, the width, the color, the moving speed, and the brightness of the preset area smoothed by using formula (8) and formula (9) may remain unchanged when the preset area is moving.

In response to the terminal 21 acquiring the audio information and adjusting the parameter of the virtual model 23 based on the attribute of the audio information such that the parameter of the virtual model 23 changes with a change of the audio information, in a case that each of the five preset areas on the virtual model 23 is stationary, each of the preset areas can be displayed at its initial position with a variable width, a variable color, and a variable brightness smoothing effect.

In response to the terminal 21 acquiring the audio information and adjusting the parameter of the virtual model 23 based on the attribute of the audio information such that the parameter of the virtual model 23 changes with a change of the audio information, in a case that each of the five preset areas on the virtual model 23 is movable, each of the preset areas can move on the virtual model 23 with a variable moving speed. In a movement of the preset area, the width, color, and brightness smoothing effect may be variable.

For example, the color finally presented by the virtual model 23 is denoted as Color. The Color may depend on the base color of the virtual model 23 and the color of each of the five preset areas on the virtual model 23. For example, the color of a first preset area among the five preset areas is denoted as OutputBand[1], the color of a second preset area is denoted as OutputBand[2], ..., and the color of a fifth preset area is denoted as OutputBand[5]. The color of each of the preset areas may be determined based on the result of the second smoothing process or the result of the fourth smoothing process. The Color may be expressed as formula (10):

$$\text{Color} = \text{albedoColor} + \text{OutputBand}[1] + \text{OutputBand}[2] + \text{OutputBand}[3] + \text{OutputBand}[4] + \text{OutputBand}[5] \quad (10)$$

As shown in FIG. 4, the terminal 21 generates five preset areas on the virtual model 23 and five preset areas on the virtual model 25. Through the method described in the embodiments of the present disclosure, the position, width, color, moving speed, brightness transition effects, and other visual properties of the preset areas can change with a change of the audio information. In addition, the base colors of the virtual model 23 and the virtual model 25 may change with the change of the audio information. Therefore, the virtual model 23 and the virtual model 25 on the image of the human face can present a rendering effect of a neon light band that is linked with the audio information.

As shown in FIG. 4, in a case that the neon light band rendering effect linked with the audio information is displayed on the image of the human face, in response to a shooting instruction from a user, the terminal 21 may capture an image of the human face with the rendering effect of the neon light band, or record a video of the human face with the rendering effect of the neon light band. Alternatively, the user may only preview the image or the video with the rendering effect of the neon light band on the screen. Further, the terminal 21 may transmit the image or the video of the human face with the rendering effect of the neon light band to other terminals or servers in response to a transmission instruction from the user.

In the method for processing a virtual model according to the embodiments of the present disclosure, after the adjustment on the parameter of the virtual model based on the attribute of the audio information, the brightness of the preset area may be further smoothed based on the parameter of the virtual model after the adjustment, so that the brightness smoothing effect from the centerline position of the preset area to the upper edge position and the lower edge position of the preset area may change with a change of the attribute of the audio information. Hence, the visual effect of the preset area is further enhanced.

Figure 14:
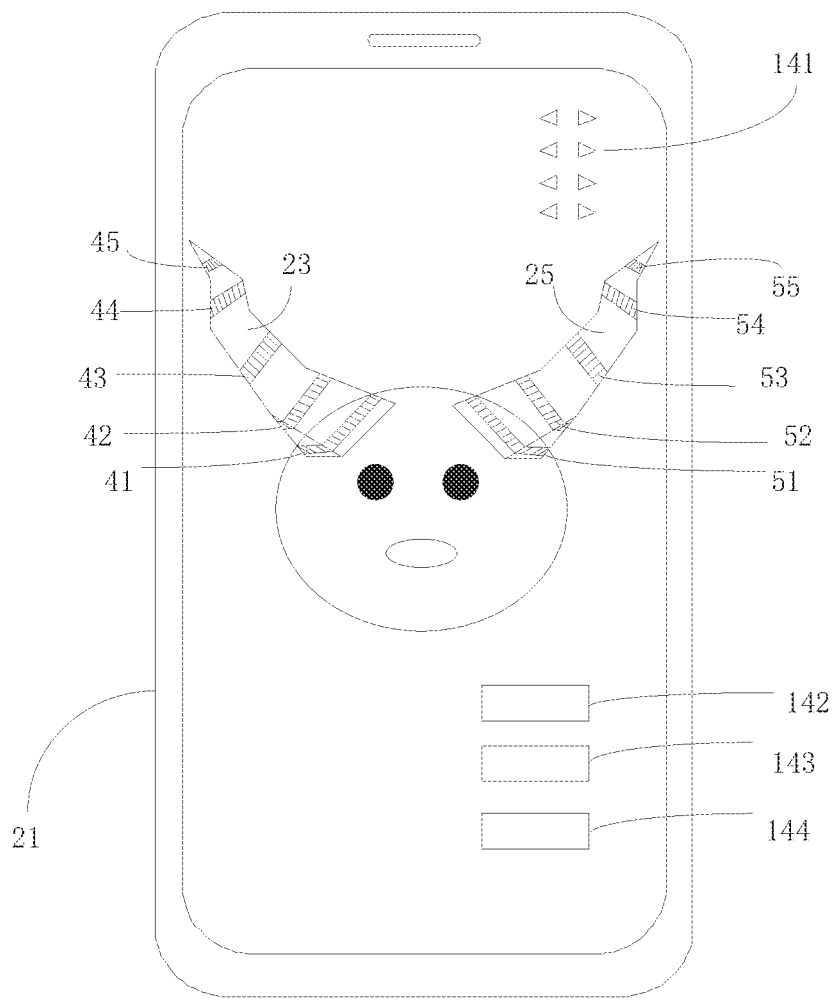
FIG. 14 is a schematic diagram of a user interface according to an embodiment of the disclosure.

On the basis of the above embodiments, some control buttons may be further provided on the user interface of the terminal 21. Reference is made to FIG. 14. Multiple groups of arrows 141 are displayed on the user interface. Each group of arrows is used to set or adjust a single parameter of the virtual model. For example, a right arrow is used to increase a value of the parameter, and a left arrow is used to decrease the value of the parameter.

For example, the user interface may be further provided with a mirror-generating button 142. The terminal 21 may generate virtual models that are mirror images of each other in the image of the human face in response to a user operation on the mirror-generating button 134. Hence, a quantity of virtual models in the image of the human face is increased.

For example, the user interface may be further provided with a return control button 143. The terminal 21 may control the user interface of the terminal 21 to jump back to the interface for capturing an image or the interface for previewing the image of the human face in response to a user operation on the return control button 143.

For another example, the user interface may be further provided with an audio switch button 144. The terminal 21 may play the audio information or stop playing the audio information in response to a user operation on the audio switch button 144.

It can be understood that the user interface shown in FIG. 14 is merely illustrative, and the quantity, positions and other factors of the control buttons on the user interface are not limited herein.

Figure 15:
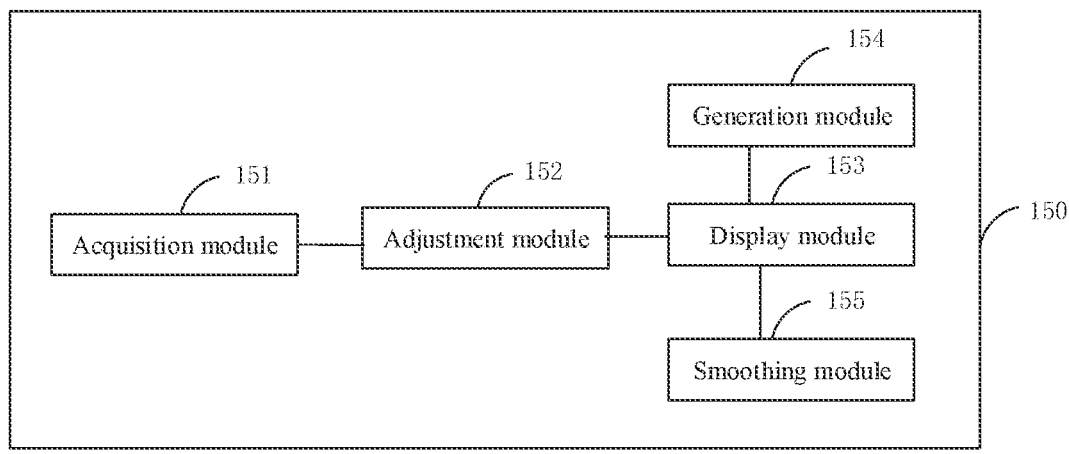
FIG. 15 is a schematic structural diagram of a device for processing a virtual model according to an embodiment of the disclosure.

FIG. 15 is a schematic structural diagram of a device for processing a virtual model according to an embodiment of the disclosure. The device for processing a virtual model provided by an embodiment of the present disclosure may be configured in a client, or may be configured in a server. A device 150 for processing a virtual model specifically includes an acquisition module 151, an adjustment module 152, and a display module 153.

The acquisition module 151 is configured to acquire audio information.

The adjustment module 152 is configured to perform an adjustment on a parameter of the virtual model based on an attribute of the audio information, and the parameter of the virtual model after the adjustment changes with time.

The display module 153 is configured to display the virtual model in a target image based on the parameter of the virtual model after the adjustment, where the virtual model displayed in the target image changes with time.

In an example, the attribute of the audio information includes at least one of: tone, volume, accent, or spectral intensity.

In an example, the parameter of the virtual model includes at least one of: a shape of the virtual model, a dimension of the virtual model, a first color of the virtual model, a position of a preset area on the virtual model, a width of the preset area on the virtual model, a moving speed of the preset area on the virtual model, or a second color of the preset area on the virtual model.

In an example, the parameter of the virtual model includes a moving speed of a preset area on the virtual model, and the adjustment module 152 is specifically configured to: adjust the speed at which the preset area moves on the virtual model based on the tone of the audio information.

In an example, the parameter of the virtual model includes a first color of the virtual model, and the adjustment module 152 is specifically configured to: adjust the first color of the virtual model based on the tone, the volume, and the accent of the audio information.

In an example, the parameter of the virtual model includes a second color of the preset area on the virtual model, and the adjustment module 152 is specifically configured to: adjust the second color of the preset area on the virtual model based on the spectral intensity of the audio information.

In an example, the parameter of the virtual model includes a width of a preset area on the virtual model, and the adjustment module 152 is specifically configured to: adjust the width of the preset area on the virtual model based on the accent of the audio information.

In an example, the parameter of the virtual model includes a moving speed of a preset area on the virtual model and a position of the preset area, and the adjustment module 152 is specifically configured to: adjust the speed at which the preset area moves on the virtual model based on the tone of the audio information; and adjust the position of the preset area based on the speed at which the preset area moves on the virtual model and an initial position of the preset area on the virtual model.

In an example, the acquisition module 151 is specifically configured to: acquire audio information played at a terminal; and/or acquire audio information from a surrounding environment.

In an example, before the acquisition module 151 acquires the audio information, the display module 153 is further configured to: display a virtual model in a target image; and display a preset area on the virtual model based on an initial parameter of the preset area. The display module 153, when displaying the virtual model in the target image based on the parameter of the virtual model after the adjustment, is specifically configured to: update the virtual model in the target image based on the parameter after the adjustment.

In an example, the device 150 further includes a generating module 154. The generating module 154 is configured to: generate the virtual model corresponding to a sliding trajectory inputted by a user on a display component, before the display module 153 displays the virtual model in the target image.

In an example, the device 150 further includes a smoothing module 155. The smoothing module 155 is configured to: smooth a brightness of the preset area based on the initial parameter of the preset area.

In an example, the smoothing module 155 is specifically configured to: perform a first smoothing process on the brightness of the preset area based on an initial width of the preset area and an initial position of the preset area; and perform a second smoothing process on the brightness of the preset area based on a result after the first smoothing process and a preset smoothing parameter.

In an example, the smoothing module 155, when performing the first smoothing process on the brightness of the preset area based on the initial width of the preset area and the initial position of the preset area, is specifically configured to: perform the first smoothing process on the brightness of the preset area based on the initial width of the preset area, the initial position of the preset area, and an initial moving speed of the preset area.

In an example, the smoothing module 155 is further configured to: smoothing a brightness of a preset area on the virtual model based on the parameter of the virtual model after the adjustment.

In an example, the smoothing processing module 155, when performing the smoothing process on the brightness of the preset area on the virtual model based on the parameter of the virtual model after the adjustment, is specifically configured to: perform a third smoothing process on the brightness of the preset area on the virtual model based on an initial position of the preset area and a width of the preset area after the adjustment; and perform a fourth smoothing process on the brightness of the preset area on the virtual model based on a result after the third smoothing process and a preset smoothing parameter.

In an example, the smoothing module 155, when performing the third smoothing processing on the brightness of the preset area on the virtual model based on the initial position of the preset area and the width of the preset area after the adjustment, is specifically configured to: perform the third smoothing process on the brightness of the preset area on the virtual model based on the initial position of the preset area, the width of the preset area after the adjustment, and a moving speed of the preset area after the adjustment.

The device for processing a virtual model provided in the embodiments of the present disclosure can execute steps performed by a client or server in the method for processing a virtual model provided by the method embodiments of the present disclosure. Specific execution and beneficial effects are not repeated here.

Figure 16:
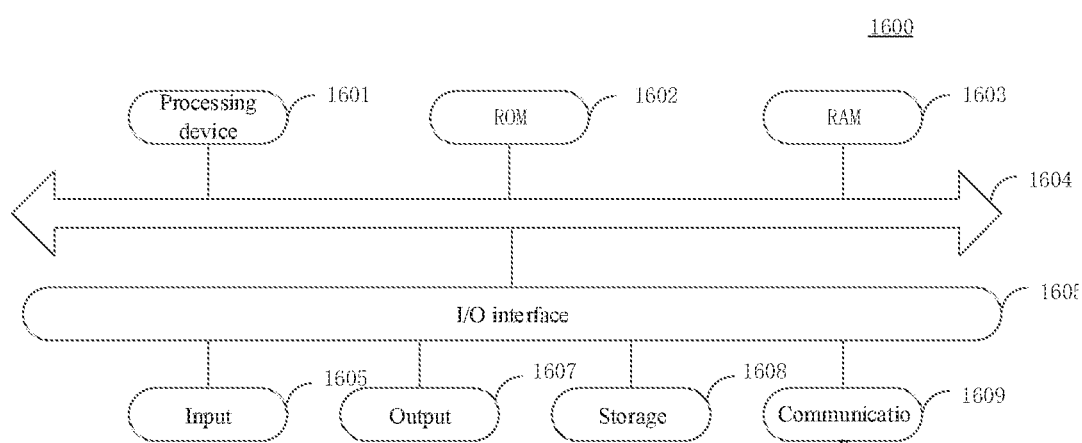
FIG. 16 is a schematic structural diagram of an electronic device according to an embodiment of the disclosure.

FIG. 16 is a schematic structural diagram of an electronic device according to an embodiment of the disclosure. Reference is made to FIG. 16, which shows a schematic structural diagram of an electronic apparatus 1600 suitable for implementing the embodiments of the present disclosure. The electronic apparatus in the embodiments of the present disclosure may include, but is not limited to, a mobile terminal, such as a mobile phone, a notebook computer, a digital broadcast receiver, a PDA (Personal Digital Assistant), a PAD (Tablet computer), a PMP (Portable Multimedia Player), a vehicle-mounted terminal (such as an in-vehicle navigation terminal), and the like, and a fixed terminal such as a digital TV, a desktop computer, and the like. The electronic apparatus shown in FIG. 16 is only an example, and should not impose any limitation on the functions and applications of the embodiments of the present disclosure.

As shown in FIG. 16, the electronic apparatus 1600 may include a processing device (such as a central processing unit, and a graphics processor) 1601 that may execute various appropriate actions and processes according to a program stored in a read only memory (ROM) 1602 or loaded into random access memory (RAM) 1603 from a storage device 1608. Various programs and data necessary for the operation of the electronic apparatus 1600 are also stored in the RAM 1603. The processing device 1601, the ROM 1602, and the RAM 1603 are connected to each other through a bus 1604. An input/output (I/O) interface 1605 is also connected to the bus 1604.

Generally, the following devices may be connected to the I/O interface 1605: an input device 1606 such as a touch screen, a touchpad, a keyboard, a mouse, a camera, a microphone, an accelerometer, a gyroscope, and the like; an output device 1607, such as a liquid crystal display (LCD), a speaker, a vibrator, and the like; a storage device 1608, such as a magnetic tape, a hard disk, and the like; and a communication device 1609. The communication device 1609 may enable the electronic apparatus 1600 to communicate in a wireless or wired manner with other devices to exchange data. Although FIG. 16 shows the electronic apparatus 1600 having various devices, it should be understood that not all of the illustrated devices are required to be implemented or provided. More or fewer devices may alternatively be implemented or provided.

In particular, according to embodiments of the present disclosure, the processes described above with reference to the flowcharts may be implemented as computer software programs. For example, embodiments of the present disclosure include a computer program product including a computer program carried on a non-transitory computer readable medium. The computer program includes program code for performing the method illustrated in the flowchart. In such an embodiment, the computer program may be downloaded and installed from the network via the communication device 1609, or from the storage device 1608, or from the ROM 1602. When the computer program is executed by the processing device 1601, the above-mentioned functions in the methods of the embodiments of the present disclosure are executed.

It should be noted that the computer-readable medium mentioned above in the present disclosure may be a computer-readable signal medium or a computer-readable storage medium, or any combination thereof. The computer-readable storage medium may be, for example, but not limited to, an electrical, magnetic, optical, electromagnetic, infrared, or semiconductor system, apparatus or device, or any combination thereof. More specific examples of computer readable storage media may include, but are not limited to, an electrical connection with one or more wires, a portable computer disk, a hard disk, a random access memory (RAM), a read only memory (ROM), an erasable Programmable read only memory (EPROM or flash memory), an optical fiber, a portable compact disk read only memory (CD-ROM), an optical storage device, a magnetic storage device, or any suitable combination thereof. In this disclosure, a computer-readable storage medium may be any tangible medium that contains or stores a program that can be used by or in conjunction with an instruction execution system, apparatus or device. In the present disclosure, a computer-readable signal medium may include a data signal propagated in baseband or as part of a carrier wave with computer-readable program code embodied thereon. Such propagated data signals may be in a variety of forms, including but not limited to electromagnetic signals, optical signals, or any suitable combination thereof. A computer-readable signal medium may be any computer-readable medium other than a computer-readable storage medium that can transmit, propagate, or transport the program for use by or in connection with the instruction execution system, apparatus or device. Program code stored on a computer readable medium may be transmitted using any suitable medium, including, but not limited to, an electrical wire, an optical fiber cable, RF (radio frequency), or any suitable combination thereof.

In some embodiments, the client and server may use any currently known or future network protocol such as HTTP (HyperText Transfer Protocol) to communicate, and may be connected with digital data network in any form or medium (such as a communication network). Examples of communication networks include local area networks (LAN), wide area networks (WAN), the Internet (e.g., the Internet), and peer-to-peer networks (such as ad hoc peer-to-peer networks), as well as any current or future network.

The above-mentioned computer-readable medium may be included in the above-mentioned electronic apparatus, or may stand alone without being assembled into the electronic apparatus.

The above-mentioned computer-readable medium carries one or more programs. The one or more programs, when executed by the electronic apparatus, configure the electronic apparatus to: acquire audio information; perform an adjustment on a parameter of the virtual model based on an attribute of the audio information, where the parameter after the adjustment changes with time; and display the virtual model in a target image based on the parameter after the adjustment, where the virtual model displayed in the target image changes with time.

Computer program code for performing operations of the present disclosure may be written in one or more programming languages, including but not limited to object-oriented programming languages, such as Java, Smalltalk, and C++, and conventional procedural programming languages, such as the "C" language or similar programming languages. The program code may be executed entirely on a user computer, or partly on a user computer, or as a stand-alone software package, or partly on a user computer and partly on a remote computer, or entirely on a remote computer or server. In the case of using a remote computer, the remote computer may be connected to a user's computer through any kind of network, including a local area network (LAN) or a wide area network (WAN), or may be connected to an external computer (e.g., using Internet connection provided by an Internet service provider).

The flowchart and block diagrams in the Figures illustrate the architecture, functionality, and operations of possible implementations of systems, methods and computer program products according to various embodiments of the present disclosure. In this regard, each block in the flowcharts or block diagrams may represent a module, program segment, or a portion of code that contains one or more executable instructions for implementing the specified logical functions. It should also be noted that, in some alternative implementations, the functions noted in the blocks may occur in an order other than the order shown in the figures. For example, two blocks shown in succession may be executed substantially concurrently, or the blocks may sometimes be executed in a reverse order, depending upon the functionality involved. It is also noted that each block of the block diagrams and/or flowchart illustrations, and combinations of blocks in the block diagrams and/or flowchart illustrations, may be implemented in dedicated hardware-based systems that perform specified functions or operations, or may be implemented by a combination of dedicated hardware and computer instructions.

The units involved in the embodiments of the present disclosure may be implemented in a software manner, or in a hardware manner. The name of the unit does not constitute a limitation of the unit under any circumstances.

The functions described above may be performed, at least in part, by one or more hardware logic components. For example, without limitation, examples of hardware logic components that may be used include: a Field Programmable Gate Array (FPGA), a Application Specific Integrated Circuit (ASIC), an Application Specific Standard Product (ASSP), a System on Chip (SOC), a Complex Programmable Logical Device (CPLD) and the like.

In the present disclosure, a machine-readable medium may be a tangible medium that may contain or store a program for use by or in connection with an instruction execution system, apparatus or device. The machine-readable medium may be a machine-readable signal medium or a machine-readable storage medium. Machine-readable media may include, but are not limited to, electronic, magnetic, optical, electromagnetic, infrared, or semiconductor systems, devices, or apparatuses, or any suitable combination thereof. More specific examples of machine-readable storage media include electrical connections based on one or more wires, portable computer disks, hard disks, random access memory (RAM), read only memory (ROM), erasable programmable read only memory (EPROM or flash memory), fiber optics, compact disk read only memory (CD-ROM), optical storage devices, magnetic storage devices, or any suitable combination thereof.

According to one or more embodiments of the present disclosure, a method for processing a virtual model is provided. The method includes: acquiring audio information; performing an adjustment on a parameter of the virtual model based on an attribute of the audio information, where the parameter of the virtual model after the adjustment changes with time; and displaying the virtual model in a target image based on the parameter after the adjustment, where the virtual model displayed in the target image changes with time.

According to one or more embodiments of the present disclosure, in the method for processing a virtual model, the attribute of the audio information includes at least one of: tone, volume, accent, or spectral intensity.

According to one or more embodiments of the present disclosure, in the method for processing a virtual model, the parameter of the virtual model includes at least one of: a shape, a dimension, and a first color of the virtual model; or a position, a width, a moving speed, and a second color of a preset area on the virtual model.

According to one or more embodiments of the present disclosure, in the method for processing a virtual model, performing the adjustment on the parameter of the virtual model based on the attribute of the audio information includes: adjusting the speed at which the preset area moves on the virtual model based on the tone of the audio information.

According to one or more embodiments of the present disclosure, in the method for processing a virtual model, performing the adjustment on the parameter of the virtual model based on the attribute of the audio information includes: adjusting the first color of the virtual model based on the tone, the volume, and the accent of the audio information.

According to one or more embodiments of the present disclosure, in the method for processing a virtual model, performing the adjustment on the parameter of the virtual model based on the attribute of the audio information includes: adjusting the second color of the preset area on the virtual model based on the spectral intensity of the audio information.

According to one or more embodiments of the present disclosure, in the method for processing a virtual model, performing the adjustment on the parameter of the virtual model based on the attribute of the audio information includes: adjusting the width of the preset area on the virtual model based on the accent of the audio information.

According to one or more embodiments of the present disclosure, in the method for processing a virtual model, performing the adjustment on the parameter of the virtual model based on the attribute of the audio information includes: adjusting the speed at which the preset area moves on the virtual model based on the tone of the audio information; and adjusting the position of the preset area based on the speed at which the preset area moves on the virtual model and an initial position of the preset area on the virtual model.

According to one or more embodiments of the present disclosure, in the method for processing a virtual model, acquiring the audio information includes: acquiring audio information played at a terminal; and/or acquiring audio information from a surrounding environment.

According to one or more embodiments of the present disclosure, in the method for processing a virtual model, before acquiring the audio information, the method further includes: displaying a virtual model in a target image; and displaying a preset area on the virtual model based on an initial parameter of the preset area. Displaying the virtual model in the target image based on the parameter after the adjustment includes: updating the virtual model in the target image based on the parameter after the adjustment.

According to one or more embodiments of the present disclosure, in the method for processing a virtual model, before displaying the virtual model in the target image, the method further includes: generating the virtual model corresponding to a sliding trajectory inputted by a user on a display component.

According to one or more embodiments of the present disclosure, in the method for processing a virtual model, the method further includes: smoothing a brightness of the preset area based on the initial parameter of the preset area.

According to one or more embodiments of the present disclosure, in the method for processing a virtual model, smoothing the brightness of the preset area based on the initial parameter of the preset area includes: performing a first smoothing process on the brightness of the preset area based on an initial width of the preset area and an initial position of the preset area; and performing a second smoothing process on the brightness of the preset area based on a result after the first smoothing process and a preset smoothing parameter.

According to one or more embodiments of the present disclosure, in the method for processing a virtual model, performing the first smoothing process on the brightness of the preset area based on the initial width of the preset area and the initial position of the preset area includes: performing the first smoothing process on the brightness of the preset area based on the initial width of the preset area, the initial position of the preset area, and an initial moving speed of the preset area.

According to one or more embodiments of the present disclosure, in the method for processing a virtual model, the method further includes: smoothing a brightness of a preset area on the virtual model based on the parameter after the adjustment.

According to one or more embodiments of the present disclosure, in the method for processing a virtual model, smoothing the brightness of the preset area on the virtual model based on the parameter after the adjustment includes: performing a third smoothing process on the brightness of the preset area on the virtual model based on an initial position of the preset area and a width of the preset area after the adjustment, and performing a fourth smoothing process on the brightness of the preset area on the virtual model based on a result after the third smoothing process and a preset smoothing parameter.

According to one or more embodiments of the present disclosure, in the method for processing a virtual model, performing the third smoothing process on the brightness of the preset area on the virtual model based on the initial position of the preset area and the width of the preset area after the adjustment includes: performing the third smoothing process on the brightness of the preset area on the virtual model based on the initial position of the preset area, the width of the preset area after the adjustment, and a moving speed of the preset area after the adjustment.

According to one or more embodiments of the present disclosure, a device for processing a virtual model is provided. The device includes: an acquisition module, configured to acquire audio information; an adjustment module, configured to adjust a parameter of the virtual model based on an attribute of the audio information, where the parameter after the adjustment changes with time; and a display module, configured to display the virtual model in a target image based on the parameter after the adjustment, where the virtual model displayed in the target image changes with time.

According to one or more embodiments of the present disclosure, in the device for processing a virtual model, the attribute of the audio information includes at least one of: tone, volume, accent, or spectral intensity.

According to one or more embodiments of the present disclosure, in the device for processing a virtual model, the parameter of the virtual model includes at least one of: a shape, a dimension, and a first color of the virtual model; or a position, a width, a moving speed, and a second color of a preset area on the virtual model.

According to one or more embodiments of the present disclosure, in the device for processing a virtual model, the adjustment module, when performing the adjustment on the parameter of the virtual model based on the attribute of the audio information, is configured to: adjust the speed at which the preset area moves on the virtual model based on the tone of the audio information.

According to one or more embodiments of the present disclosure, in the device for processing a virtual model, the adjustment module, when performing the adjustment on the parameter of the virtual model based on the attribute of the audio information, is configured to: adjust the first color of the virtual model based on the tone, the volume, and the accent of the audio information.

According to one or more embodiments of the present disclosure, in the device for processing a virtual model, the adjustment module, when performing the adjustment on the parameter of the virtual model based on the attribute of the audio information, is configured to: adjust the second color of the preset area on the virtual model based on the spectral intensity of the audio information.

According to one or more embodiments of the present disclosure, in the device for processing a virtual model, the adjustment module, when performing the adjustment on the parameter of the virtual model based on the attribute of the audio information, is configured to: adjust the width of the preset area on the virtual model based on the accent of the audio information.

According to one or more embodiments of the present disclosure, in the device for processing a virtual model, the adjustment module, when performing the adjustment on the parameter of the virtual model based on the attribute of the audio information, is configured to: adjust the speed at which the preset area moves on the virtual model based on the tone of the audio information; and adjust the position of the preset area based on the speed at which the preset area moves on the virtual model and an initial position of the preset area on the virtual model.

According to one or more embodiments of the present disclosure, in the device for processing a virtual model, the acquisition module, when acquiring the audio information, is configured to: acquire audio information played at a terminal; and/or acquire audio information from a surrounding environment.

According to one or more embodiments of the present disclosure, in the device for processing a virtual model, the display module is further configured to: before acquiring the audio information, display a virtual model in a target image and display a preset area on the virtual model based on an initial parameter of the preset area. When displaying the virtual model in the target image based on the parameter after the adjustment, the display module is specifically configured to: update the virtual model in the target image based on the parameter after the adjustment.

According to one or more embodiments of the present disclosure, the device for processing a virtual model further includes a generation module. The generation module is configured to: before the display module displaying the virtual model in the target image, generate the virtual model corresponding to a sliding trajectory inputted by a user on a display component.

According to one or more embodiments of the present disclosure, the device for processing a virtual model further includes a smoothing module. The smoothing module is configured to: smooth a brightness of the preset area based on the initial parameter of the preset area.

According to one or more embodiments of the present disclosure, in the device for processing a virtual model, the smoothing module, when smoothing the brightness of the preset area based on the initial parameter of the preset area, is configured to: perform a first smoothing process on the brightness of the preset area based on an initial width of the preset area and an initial position of the preset area; and perform a second smoothing process on the brightness of the preset area based on a result after the first smoothing process and a preset smoothing parameter.

According to one or more embodiments of the present disclosure, in the device for processing a virtual model, the smoothing module, when performing the first smoothing process on the brightness of the preset area based on the initial width of the preset area and the initial position of the preset area, is configured to: perform the first smoothing process on the brightness of the preset area based on the initial width of the preset area, the initial position of the preset area, and an initial moving speed of the preset area.

According to one or more embodiments of the present disclosure, in the device for processing a virtual model, the smoothing module is further configured to: smooth a brightness of a preset area on the virtual model based on the parameter after the adjustment.

According to one or more embodiments of the present disclosure, in the device for processing a virtual model, the smoothing module, when smoothing the brightness of the preset area on the virtual model based on the parameter after the adjustment is specifically configured to: perform a third smoothing process on the brightness of the preset area on the virtual model based on an initial position of the preset area and a width of the preset area after the adjustment; and perform a fourth smoothing process on the brightness of the preset area on the virtual model based on a result after the third smoothing process and a preset smoothing parameter.

According to one or more embodiments of the present disclosure, in the device for processing a virtual model, the smoothing device, when performing the third smoothing process on the brightness of the preset area on the virtual model based on the initial position of the preset area and the width of the preset area after the adjustment, is specifically configured to: perform the third smoothing process on the brightness of the preset area on the virtual model based on the initial position of the preset area, the width of the preset area after the adjustment, and a moving speed of the preset area after the adjustment.

According to one or more embodiments of the present disclosure, an electronic apparatus is provided in the present disclosure. The electronic apparatus includes: one or more processors; and a memory storing one or more programs. The one or more programs, when executed by the one or more processors, causes the one or more processors to implement the method for processing a virtual model according to any one of the embodiments of the present disclosure.

According to one or more embodiments of the present disclosure, a computer-readable storage medium is provided in the present disclosure. The computer-readable storage medium stores a computer program. The computer program, when executed by a processor, implements the method for processing a virtual model according to any one of the embodiments of the present disclosure.

The above merely describes preferred embodiments of the present disclosure and illustrates the technical principles. Those skilled in the art should understand that the scope of the disclosure is not limited to the technical solutions formed by the specific combination of the above-mentioned technical features, and should also cover, without departing from the above disclosed concept, the technical solutions formed by any combination of the above-mentioned technical features or other equivalent features. For example, a technical solution may be formed by replacing a feature with another feature having similar function disclosed in (but not limited to) the present disclosure.

Additionally, although operations are described in a particular order, this should not be construed as requiring that the operations to be performed in the particular order shown or in a sequential order. Under certain circumstances, multitasking and parallel processing may be advantageous. Similarly, although the above description contains several implementation details, these should not be construed as limitations on the scope of the present disclosure. Some features that are described in different embodiments may also be implemented in a same embodiment. Also, various features that are described in a single embodiment may be implemented in multiple embodiments separately or in any suitable sub-combination.

Although the subject matter has been described in language specific to structural features and/or logical acts, it is to be understood that the subject matter defined in the appended claims is not necessarily limited to the specific features or acts described above. Rather, the specific features and acts described above are merely examples for implementing the claims.

The invention claimed is:

1. A method for processing a virtual model, comprising:
acquiring audio information;
performing an adjustment on a parameter of the virtual model based on an attribute of the audio information, wherein the parameter of the virtual model after the adjustment changes with time;
displaying the virtual model in a target image based on the parameter of the virtual model after the adjustment, wherein the virtual model displayed in the target image changes with time; and
smoothing a brightness of a preset area on the virtual model based on the parameter of the virtual model after the adjustment, comprising:
performing a third smoothing process on the brightness of the preset area on the virtual model based on an initial position of the preset area and a width of the preset area after the adjustment; and
performing a fourth smoothing process on the brightness of the preset area on the virtual model based on a result after the third smoothing process and a preset smoothing parameter.

2. The method according to claim 1, wherein the attribute of the audio information comprises at least one of: tone, volume, accent, and spectral intensity.

3. The method according to claim 2, wherein the parameter of the virtual model comprises a speed at which a preset area on the virtual model moves on the virtual model, and performing the adjustment on the parameter of the virtual model based on the attribute of the audio information comprises:
adjusting, based on the tone of the audio information, the speed at which the preset area moves on the virtual model.

4. The method according to claim 2, wherein the parameter of the virtual model comprises a first color of the virtual model, and performing the adjustment on the parameter of the virtual model based on the attribute of the audio information comprises:
adjusting the first color of the virtual model based on the tone, the volume, and the accent of the audio information.

5. The method according to claim 2, wherein the parameter of the virtual model comprises a second color of a preset area on the virtual model, and performing the adjustment on the parameter of the virtual model based on the attribute of the audio information comprises:
adjusting the second color of the preset area on the virtual model based on the spectral intensity of the audio information.

6. The method according to claim 2, wherein the parameter of the virtual model comprises a width of a preset area on the virtual model, and performing the adjustment on the parameter of the virtual model based on the attribute of the audio information comprises:
adjusting the width of the preset area on the virtual model based on the accent of the audio information.

7. The method according to claim 2, wherein the parameter of the virtual model comprises a speed at which a preset area on the virtual model moves on the virtual model and a position of the preset area; and performing the adjustment on the parameter of the virtual model based on the attribute of the audio information comprises:
adjusting, based on the tone of the audio information, the speed at which the preset area moves on the virtual model; and
adjusting the position of the preset area based on the speed at which the preset area moves on the virtual model and an initial position of the preset area on the virtual model.

8. The method according to claim 1, wherein the parameter of the virtual model comprises at least one of:
a shape of the virtual model, a dimension of the virtual model, a first color of the virtual model, a position of a preset area on the virtual model, a width of the preset area, a moving speed of the preset area, and a second color of the preset area.

9. The method according to claim 1, wherein acquiring the audio information comprises at least one of:
acquiring audio information played at a terminal; and
acquiring audio information from a surrounding environment.

10. The method according to claim 1, wherein
before acquiring the audio information, the method further comprises:
initially displaying the virtual model in the target image; and
displaying a preset area on the virtual model based on an initial parameter of the preset area; and
the displaying the virtual model in the target image based on the parameter of the virtual model after the adjustment comprises:
updating the virtual model in the target image based on the parameter of the virtual model after the adjustment.

11. The method according to claim 10, wherein before initially displaying the virtual model in the target image, the method further comprises:
generating the virtual model corresponding to a sliding trajectory inputted by a user on a display component.

12. The method according to claim 10, wherein the method further comprises: smoothing a brightness of the preset area based on the initial parameter of the preset area.

13. The method according to claim 12, wherein smoothing the brightness of the preset area based on the initial parameter of the preset area comprises:
performing a first smoothing process on the brightness of the preset area based on an initial width of the preset area and an initial position of the preset area; and
performing a second smoothing process on the brightness of the preset area based on a result after the first smoothing process and a preset smoothing parameter.

14. The method according to claim 13, wherein performing the first smoothing process on the brightness of the preset area based on the initial width of the preset area and the initial position of the preset area comprises:
performing the first smoothing process on the brightness of the preset area based on the initial width of the preset area, the initial position of the preset area, and an initial moving speed of the preset area.

15. The method according to claim 1, wherein performing the third smoothing process on the brightness of the preset area on the virtual model based on the initial position of the preset area and the width of the preset area after the adjustment comprises:
performing the third smoothing process on the brightness of the preset area on the virtual model based on the initial position of the preset area, the width of the preset area after the adjustment, and a moving speed of the preset area after the adjustment.

16. An electronic device, comprising:
one or more processors; and
a storage storing one or more programs; wherein
the one or more programs, when being executed by the one or more processors, causes the one or more processors to implement:
acquiring audio information;
performing an adjustment on a parameter of the virtual model based on an attribute of the audio information, wherein the parameter of the virtual model after the adjustment changes with time;
displaying the virtual model in a target image based on the parameter of the virtual model after the adjustment, wherein the virtual model displayed in the target image changes with time; and
smoothing a brightness of a preset area on the virtual model based on the parameter of the virtual model after the adjustment, comprising:
performing a third smoothing process on the brightness of the preset area on the virtual model based on an initial position of the preset area and a width of the preset area after the adjustment; and
performing a fourth smoothing process on the brightness of the preset area on the virtual model based on a result after the third smoothing process and a preset smoothing parameter.

17. A non-transitory computer-readable storage medium having a computer program stored thereon, wherein the computer program, when being executed by a processor, implements:
acquiring audio information;
performing an adjustment on a parameter of the virtual model based on an attribute of the audio information, wherein the parameter of the virtual model after the adjustment changes with time;
displaying the virtual model in a target image based on the parameter of the virtual model after the adjustment, wherein the virtual model displayed in the target image changes with time; and
smoothing a brightness of a preset area on the virtual model based on the parameter of the virtual model after the adjustment, comprising:
performing a third smoothing process on the brightness of the preset area on the virtual model based on an initial position of the preset area and a width of the preset area after the adjustment; and
performing a fourth smoothing process on the brightness of the preset area on the virtual model based on a result after the third smoothing process and a preset smoothing parameter.

\* \* \* \* \*